(12) United States Patent
Iwaya et al.

(10) Patent No.: US 7,177,438 B2
(45) Date of Patent: Feb. 13, 2007

(54) SPEAKER FOR VEHICLE AND MOUNTING STRUCTURE OF THE SPEAKER

(75) Inventors: Shogo Iwaya, Kawasaki (JP); Sukeyoshi Nakashima, Tokyo (JP); Taizo Nakamura, Tokyo (JP); Karebu Kirihara, Kawasaki (JP)

(73) Assignees: Mitsubishi Jidosha Kogyo Kabushiki Kaisha, Tokyo (JP); Mitsubishi Jidosha Engineering Kabushiki Kaisha, Kanagawa (JP)

( * ) Notice: Subject to any disclaimer, the term of this patent is extended or adjusted under 35 U.S.C. 154(b) by 588 days.

(21) Appl. No.: 10/474,732

(22) PCT Filed: Oct. 31, 2002

(86) PCT No.: PCT/JP02/11367

§ 371 (c)(1),
(2), (4) Date: Oct. 14, 2003

(87) PCT Pub. No.: WO03/043372

PCT Pub. Date: May 22, 2003

(65) Prior Publication Data

US 2004/0247150 A1 Dec. 9, 2004

(30) Foreign Application Priority Data

Nov. 16, 2001 (JP) .............................. 2001-352301

(51) Int. Cl.
*H04R 25/00* (2006.01)
(52) U.S. Cl. .................. 381/389; 381/302; 381/87; 381/365
(58) Field of Classification Search ................ 381/302, 381/86, 87, 365, 386, 389, 395
See application file for complete search history.

(56) References Cited

U.S. PATENT DOCUMENTS

| 5,048,089 | A | * | 9/1991 | Moore | ........................ 381/389 |
| 5,414,229 | A | * | 5/1995 | Rocheleau et al. | ......... 381/389 |
| 6,258,438 | B1 | * | 7/2001 | Loveland et al. | ........... 381/389 |

FOREIGN PATENT DOCUMENTS

| JP | 56-135675 U | 10/1981 |
| JP | 58-7034 U | 1/1983 |

(Continued)

*Primary Examiner*—Suhan Ni
(74) *Attorney, Agent, or Firm*—Birch, Stewart, Kolasch & Birch, LLP

(57) ABSTRACT

The present invention relates to a speaker for a vehicle and an installation structure therefor, and it is an object of the invention to enhance the speaker installation rigidity without impairing the acoustic characteristic of the speaker. The speaker installation structure comprises a speaker unit (1) for holding a speaker body (11) and having a plurality of claws (13) and a panel member (3) having an opening (4) and a plurality of slits (5). For the installation of the speaker unit (1), the plurality of claws (13) are inserted into the plurality of slits (5), respectively, and the speaker unit (1) is rotated in its circumferential direction. The opening (4) is made to be smaller than the diameter of a speaker housing (12) and to have at least three linear portions (41). Each of the slits (5) is formed outside the three linear portions (41) and inside an outer circumference of the speaker housing (12).

12 Claims, 24 Drawing Sheets

FOREIGN PATENT DOCUMENTS

| | | |
|---|---|---|
| JP | 61-124191 U | 8/1986 |
| JP | 6-3746 U | 1/1994 |
| JP | 6-44288 U | 6/1994 |
| JP | 11-342800 U | 12/1999 |
| JP | 2001-36987 A | 2/2001 |
| JP | 2001-169374 A | 6/2001 |
| JP | 2003154899 | 5/2003 |

* cited by examiner

R-R

F I G. 1 2
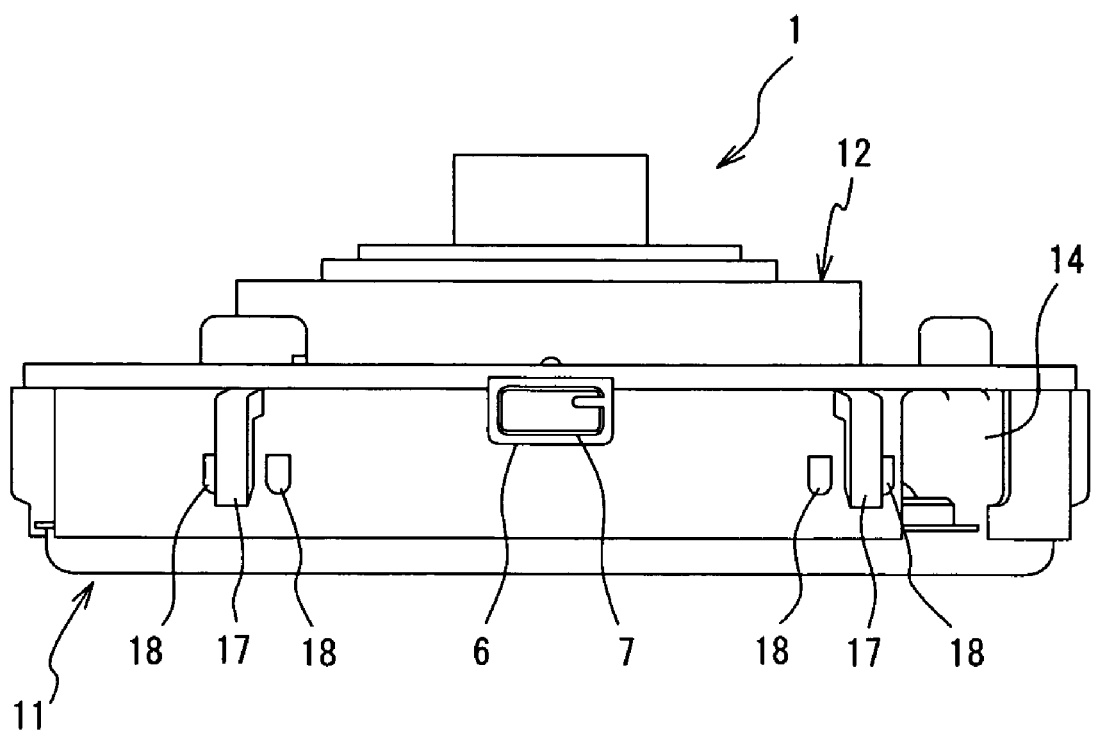

I — I

K—K

N−N

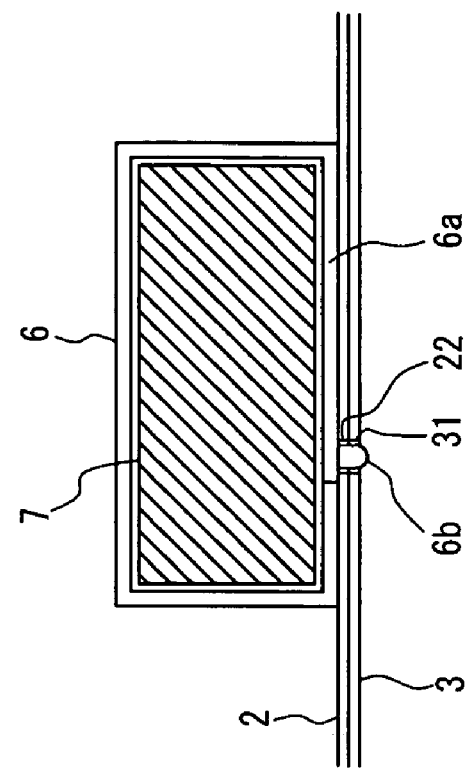
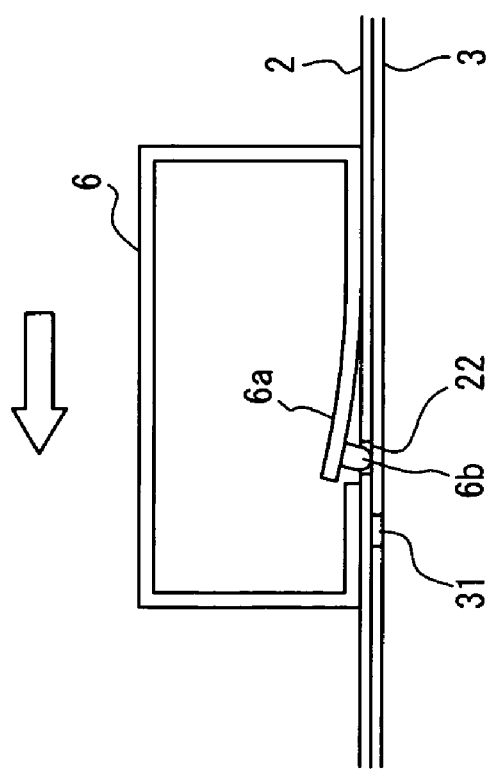

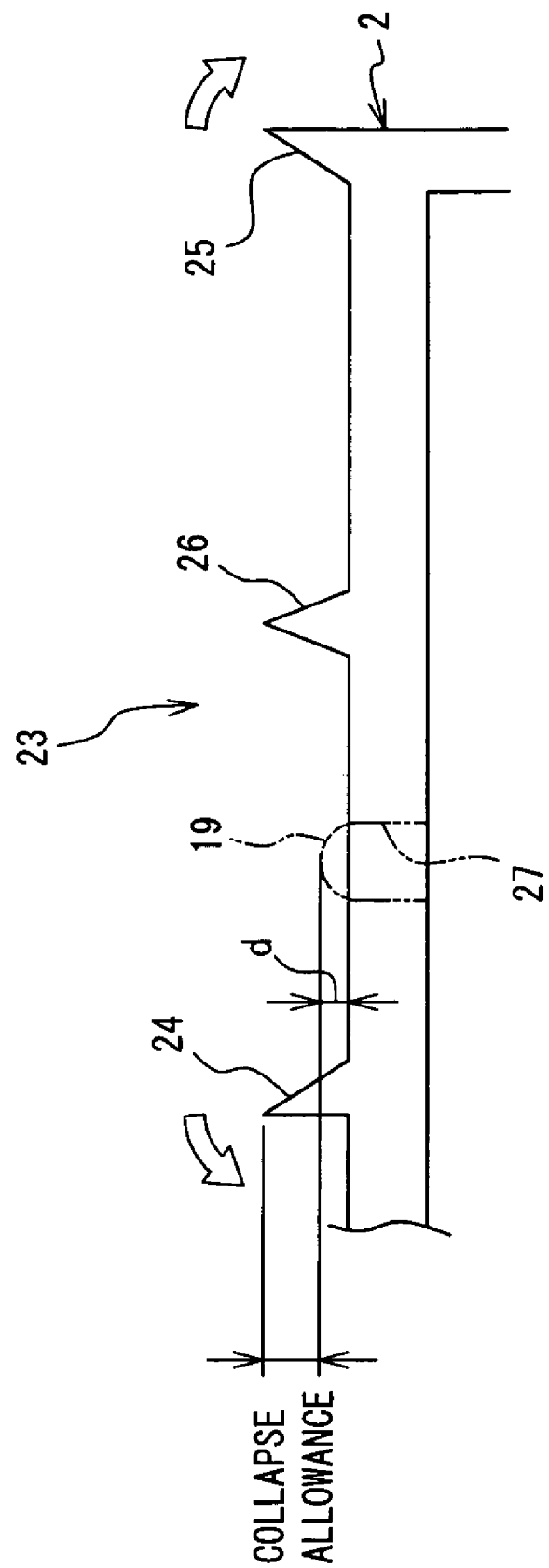

SPEAKER FOR VEHICLE AND MOUNTING STRUCTURE OF THE SPEAKER

This application is the national phase under 35 U.S.C. § 371 of PCT International Application No. PCT/JP02/11367 wich has an International filing date of Oct. 31, 2002, which designated the United States of America.

TECHNICAL FIELD

The present invention relates to a speaker for a vehicle and an installation structure therefor, made to be installed in the interior of the vehicle such as a car.

BACKGROUND ART

So far, a speaker has been attached onto a door, rear shelf or the like of a car. With reference to FIG. 23, a description will be given herein below of one example of an installation structure of a speaker. In a door panel 104 of a car, there is made an opening 105 which is used for mounting a speaker unit 101.

At predetermined positions around this opening 105, a plurality of fitting holes 104a are formed to accept grommets 102 to be threadly engaged with small screws 103.

Accordingly, a worker aligns screw holes 101a made in the speaker unit 101 with the grommets 102 fitted in the door panel 104, and passes the screws 103 through the screw holes 101a and threadly engages the screws 103 with fitting holes 102a of the grommets 102 while maintaining the state in which the speaker unit 101 is located at the opening 105.

In addition, through such a work, the speaker unit 101 is installed at a predetermined position of the opening 105 of the door panel 104.

However, this installation structure requires the employment of the grommets 102 because consideration is given to the generation of rust in the speaker unit attaching section, which leads to an increase in number of parts. In addition, this requires a large amount of man-power for the installation of the speaker unit 101.

Accordingly, the aforesaid installation structure creates, for example, the following problems:

(1) a high manufacturing cost;
(2) a long assembling time;
(3) a requirement for precise alignment between the screw holes 101a of the speaker unit 101 and the grommets 102, which lowers the working efficiency or workability; and
(4) a need for a worker to operate while holding the speaker unit 101, the screws 103 and a tool (driver) simultaneously, which lowers the productivity.

For this reason, a rotary installation structure, which has been employed recently in various fields, has been proposed in place of such a speaker installation structure using screws.

This rotary installation structure is such that a slit having wide first slit portions and narrow second slit portions communicated with the first slit portions is made in an attached side (in the above-mentioned example, the door panel) and projections are formed on an attaching side (in the aforesaid example, the speaker unit) and the attaching side (speaker unit) is rotated in a state where the projections are inserted into the first slit portions to engage the projections, formed on the attaching side, with groove portions, made in the attached side, at the second slit portions, thereby fixedly securing the attaching side.

This construction can eliminate the need for the employment of the grommets, screws and others, which are required in the conventional technique, and permits the installation work without using a special tool. For example, Japanese Patent Laid-Open No. 2001-169374 discloses a technique in which this rotary attachment structure is applied to speaker installation.

With reference to FIG. 24, a brief description will be given hereinbelow of the technique disclosed in the aforesaid Japanese Patent Laid-Open No. 2001-169374. A perspective view of FIG. 24 illustrates a state immediately before the installation of a speaker unit 101 onto a speaker unit mounting plate 160 on a door panel 201 of a vehicle.

The speaker unit 101 includes a speaker body (main body) 111 having a resin-made speaker frame 120 and a drip-proof cover 113. Moreover, the speaker body 111 is held at a predetermined position of a generally central portion of the ring-like speaker frame 120 by bridges 120b radially formed in the interior of the speaker frame 120.

In addition, on the bridges 120b, there are integrally formed a plurality of engaging pieces 140 (upper, lower, right and left pieces; four in total) which protrude to the back side. Still additionally, one contact piece 150 is formed on the bridge 120b near the top portion of the speaker frame 120. The contact piece 150 is formed to protrude to the back side and made to have elasticity in a radial direction of the speaker frame 120. Yet additionally, on the rear surface of the speaker frame 120, a cushion 120a is put at a place which comes into contact with the speaker unit mounting plate 160.

Furthermore, a mounting opening 170 having a step is made in the speaker unit mounting plate 160, and engaging piece insertion notch portions 180a are made at positions corresponding to the engaging pieces 140 in the mounting opening 170. An opening portion of each of the engaging piece insertion notch portions 180a is connected through an inclined portion 180b to a narrow engaging piece engaging portion 180c. Still furthermore, in the mounting opening 170, a contact piece insertion notch portion 190a is made at a position corresponding to the contact piece 150, a contact piece stopping notch portion 190b is made to follow that contact piece insertion notch portion 190a. Yet furthermore, a stopping portion 190c is formed between the contact piece insertion notch portion 190a and the contact piece stopping notch portion 190b.

Thus, in mounting the speaker unit 101 to the speaker unit mounting plate 160, in FIG. 24, the speaker unit 101 is inserted into the mounting opening 170 from the front side of the speaker unit mounting plate 160. At this time, the engaging piece 140 is inserted into the engaging piece insertion notch portion 180a, and the contact piece 150 is inserted into the contact piece insertion notch portion 190a.

In addition, in this state, the speaker unit 101 is rotated in a direction indicated by an arrow Z. In consequence, each of the engaging pieces 140 is guided by the inclined portion 180b to be engaged with the engaging piece engaging portion 180c so that the speaker unit 101 is surely and firmly fixed to the speaker unit mounting plate 160.

Still additionally, when the speaker unit 101 is rotated in the arrow Z direction, the contact piece 150 goes from the contact piece insertion notch portion 190a through the stopping portion 190c to engage with the contact piece stopping notch portion 190b. Accordingly, even if the speaker unit 101 is rotated in the opposite direction (a direction opposite to the arrow Z direction), the contact piece 150 is brought into contact with the stopping portion 190c to inhibit the rotation of the speaker unit 101 in the opposite direction.

Yet additionally, an inner circumferential wall (flange) 121 is formed on an inner circumferential surface of the mounting opening 170 to protrude to the back side. When the speaker unit 101 is set on the speaker unit mounting plate 160, this inner circumferential wall 121 is brought into surface contact with the drip-proof cover 113 of the speaker unit 101 to enhance the installation strength of the speaker unit 101 and further to prevent the looseness at the installation. Add to it that the employment of this inner circumferential wall 121 achieves the improvement of the strength of the mounting plate 160 itself.

However, the technique disclosed in the above-mentioned Japanese Patent Laid-Open No. 2001-169374 creates the following problems.

That is, in the case of a speaker for motor vehicles, particularly for doors, the installation place is strictly limited, and the speaker 101 is required to be firmly fixed to withstand the impacts stemming from the vibration of the vehicle body or the opening and closure of the door.

For securing a high rigidity, it would be considered that the opening itself is made to have as small diameter as possible. That is, the reduction of the opening area improves the rigidity of the speaker unit mounting plate 160 accordingly.

However, since the speaker 101 requires the employment of the drip-proof cover 113 and others, limitation is imposed on the reduction of the diameter of the opening 170. Moreover, for the acoustic characteristic, it is desirable that the opening area is large, but this disagrees with it.

In addition, for enhancing the installation rigidity of the speaker 101, it is preferable that the notch portion 180a is brought close to the opening 170 to the utmost. This is because the strength of the mounting plate 160 increases as it is put closer to the inner circumferential wall (flange) 121.

However, from a processing point of view, the formation of the flange 121 makes it difficult to form the notch portion 180a in the vicinity of the flange 121.

Thus, in the case of the formation of the flange 121, the notch portion 180a is required to be located at a position remote from the opening edge in some degree and difficulty is encountered in improving the above-mentioned installation rigidity of the speaker 101.

Moreover, in the above-described conventional speaker installation structure, as a problem, working holes or the like for installation are not made particularly around the speaker unit, so it is not easy to hold the speaker. Still moreover, in mounting the speaker while rotating it, the speaker is slippy on hand, which lowers the working efficiency.

Still moreover, the above-described conventional technique requires the special formation of a rotation preventing contact piece (see reference numeral 15 in Japanese Patent Laid-Open NO. 2001-169374) for limiting the reverse rotation of the speaker to the detachment side in order to prevent the rotation of the speaker after the installation, which leads to a complicated construction.

Yet moreover, the conventional technique discloses that the cushion 120a is put between the speaker and the door panel. Although it does not disclose the material for the formation of the cushion 120a at all, a general material is a sponge (urethane foam).

However, in the case of the rotary installation structure, since the sponge 120a produces a large sliding resistance, the installation efficiency is low and a partial break occurs at rotation, which impairs the sealing performance.

On the other hand, a surface of a speaker to be installed in a car is covered with a trim material or the like, and between the speaker and the trim material, there is interposed a material such as an urethane foam or sponge, for example, disclosed in Japanese Patent Laid-Open No. HEI 11-342800.

In addition, for exhibiting a function as a speaker, sometimes, there is interposed a spacer, called a gasket or arrow rubber, which limits its height direction to prevent the contact of the rim material or the like with the cover even if a speaker cone edge vibrates. Thus, Japanese Patent Laid-Open No. 2000-36987 discloses a technique of integrally forming the cone edge and the arrow rubber.

Although the material such as a sponge can previously be adhered to the speaker side or the trim side, these encounter troublesome positioning in the case of the adhesion of the sponge, which costs much labor.

Still additionally, because of easy deformation, the urethane foam or sponge, when put to use, is required to have some degree of thickness, otherwise the interference with the trim occurs, thereby generating a rattling sound, trembling sound or the like. Yet additionally, there is a need to use a gasket or arrow rubber separately, which increases the number of parts.

The present invention has been developed with a view to eliminating the above-mentioned problems, and it is therefore an object of the invention to 1) simplify an installation structure for a speaker and further to enhance the installation rigidity of a speaker without impairing the acoustic characteristic of the speaker, 2) improve the installation work efficiency, 3) prevent the dropout or looseness of the speaker unit, 4) improve the seal performance, and 5) decrease the number of parts of the speaker.

DISCLOSURE OF THE INVENTION

To achieve the above-described object, there is provided a vehicle speaker installation structure comprising a speaker unit including a speaker housing for holding a speaker body, with the speaker housing having a plurality of claws formed thereon, and a panel member having an opening and a plurality of slits made therein so that the plurality of claws are inserted into the plurality of slits, respectively, and the speaker unit is mounted on the panel member by rotating the speaker housing in its circumferential direction, wherein the opening has a diameter smaller than a diameter of the speaker housing and has at least three linear portions, and each of the plurality of slits is made outside the three linear portions and inside an outer circumference of the speaker housing.

With this structure, even if the distance between the opening and the slits is set to be large, when the speaker unit is rotated at the installation of the speaker unit, the claws are brought close to the edge portion of the opening having a high rigidity to engage therewith in the vicinity of the edge portion. This improves the mounting rigidity, and allows the opening to have a large area, thus preventing the acoustic characteristic of the speaker from being impaired.

In addition, preferably, each of the claws has an L-shaped cross section having a tip portion bent toward the opening side in an installed state of the speaker unit and an arm portion connecting the tip portion to the speaker housing, and each of the slits has a first slit portion into which the tip portion of the claw is inserted and a second slit portion made to accept the insertion of only the arm portion, after the tip portion of the claw is inserted into the first slit portion, the speaker unit being rotated to shift the arm portion to the interior of the second slit portion so that the tip portion is brought close to an edge side of the opening.

This construction enables the tip portion of the claw to be engaged in the vicinity of the edge of the opening at the installation of the speaker unit, thereby enhancing the installation rigidity.

Still additionally, preferably, the relatively positional relationship between the slit and the linear portion is set so that the claw approaches the linear portion at the rotation of the speaker unit.

This construction also enables the tip portion of the claw to be engaged in the vicinity of the edge of the opening at the installation of the speaker unit, thereby enhancing the installation rigidity.

Furthermore, a vehicle speaker installation structure according to the present invention comprises a speaker unit including a speaker housing for holding a speaker body, with the speaker housing having a plurality of claws formed thereon, and a panel member having an opening and a plurality of slits made therein so that the plurality of claws are inserted into the plurality of slits, respectively, and the speaker unit is mounted on the panel member by rotating the speaker housing in its circumferential direction, wherein a plurality of indentations are made in an outer circumference of the speaker housing.

This structure permits a worker to carry out the installation work while putting his/her fingers in the indentations, thus improving the workability. This eliminates the need to increase the size of the speaker unit for the improvement of the working efficiency.

Moreover, preferably, the indentations are located to be in symmetrical relation to each other with respect to the center of the speaker unit. With this construction, the worker can more easily hold the speaker housing by both his/her hands, thus further improving the workability.

Still moreover, preferably, the speaker body includes a speaker cone and a cone edge formed on an outer circumference of the speaker cone, while the speaker housing includes a flange made to come into contact with an outer circumferential edge of the cone edge and an opening made inside the flange in an axial direction of the speaker housing, and the indentation is formed by a first mold having an extension which extends from the flange through the opening of the speaker housing in the axial direction of the speaker housing, with the extension being drawn in the axial direction of the speaker housing, and a second mold extending from the flange in an outer circumferential direction and made to be drawn in an axial direction opposite to the axial direction of the drawing of the first mold.

This construction eliminates the need for slide mold to be drawn in a radial direction, and enables easy formation of the speaker housing at a low cost.

Yet moreover, it is also appropriate that a rubber-made sealing member is placed on a panel mounting side of the speaker housing and a closing piece is formed on the sealing member to close the opening of the speaker housing.

The interposition of the above-mentioned rubber-made sealing member reduces the sliding resistance at rotation with respect to a sponge, which has been used so far, thereby improving the installation efficiency.

Add to it that, although the formation of the opening in the speaker housing produces an air flow and, hence, is not preferable from the viewpoint of acoustic characteristic, the formation of the closing piece on the sealing member for closing the opening can improve acoustic characteristic.

In addition, preferably, a harness for power supply is connected to the speaker unit, and a clip for fixing the harness is formed on an outer circumferential edge of the speaker housing.

This construction enables the harness to be easily interposed between the clip and the outer circumference of the speaker housing after the installation of the speaker, thereby accomplishing secure fixture of the harness.

More preferably, the clip is constructed such that its one end is fixed to the outer circumference of the speaker housing and the other end is an open end, while a projection is formed on the outer circumference of the speaker housing in the vicinity of the one end of the clip to protrude outwardly.

This securely prevents the falloff of the harness caught by the clip.

Still additionally, it is also appropriate that the tip portion of the other end of the clip is formed into a wedge-like configuration, and the projection is made to have a roundness on the tip portion side of the other end of the clip and a vertical surface on the opposite side thereof.

This prevents the projection itself from producing the hindrance at the insertion of the harness, and allows the harness to be smoothly inserted into the clip even by groping. Add to it that this prevents the harness from being separated from the clip.

Moreover, a vehicle speaker installation structure according to the present invention comprises a speaker unit including a speaker housing for holding a speaker body, with the speaker housing having a plurality of claws formed thereon, and a panel member having an opening and a plurality of slits made therein so that the plurality of claws are inserted into the plurality of slits, respectively, and the speaker unit is mounted on the panel member by rotating the speaker housing in its circumferential direction, wherein a connector to be connected to a harness terminal for power supply to the speaker body is placed on the speaker housing, and an elastic piece, made to be elastically deformed by the panel member in a direction opposite to the panel member when the claws are inserted into the slits and returned to the panel side when the speaker housing is rotated up to a predetermined position, is formed on the connector, with the harness terminal being connectable to the connector only when the elastic piece is returned to the panel member side.

This enables the speaker unit to be surely positioned by the connector. Moreover, after the harness is once connected thereto, the speaker unit can be rotated only when the harness is disconnected therefrom. Therefore, it is possible to securely prevent the dropout or looseness of the speaker unit. Still moreover, since this offers a rotation preventing function, there is no need to newly employ a rotation preventing member, which leads to a simple structure.

In addition, preferably, a protruding portion is formed on the elastic piece to protrude toward the panel member side, while a recess portion is made in the panel member to engage with the protruding portion when the speaker housing is at a predetermined position.

With this construction, the protruding portion and the recess portion engage with each other when the speaker unit is rotated to reach the predetermined position. This creates a detent sensation (moderation sensation), so a worker can sense that the unit has reached a correct position, which leads to the enhancement of the assembling efficiency.

More preferably, the connector is constructed independently of the speaker housing and at least the elastic piece is made of a material softer than that of the speaker housing.

In this case, although, from the viewpoint of the acoustic characteristic and the installation rigidity, it is preferable that the speaker housing has a firm construction, if it is too hard, the deformation of the elastic piece becomes difficult and is becomes breakable. Accordingly, when the elastic piece is made of a material softer than that of the speaker housing as mentioned above, the compatibility of the improvement of sound quality of the speaker and the elastic deformation of the connector is achievable.

Furthermore, a vehicle speaker installation structure according to the present invention comprises a speaker unit including a speaker housing for holding a speaker body, with the speaker housing having a plurality of claws formed thereon, and a panel member having an opening and a plurality of slits made therein so that the plurality of claws are inserted into the plurality of slits, respectively, and the speaker unit is mounted on the panel member by rotating the speaker housing in its circumferential direction, wherein a rubber-made sealing member having lip means on a panel member contact side is interposed between the speaker housing and the panel member.

Thus, since the sealing member is made of a rubber, it is possible to reduce the sliding resistance of the sealing member at the installation work, which leads to the enhancement of the working efficiency. Moreover, the lip means formed on the sealing member efficiently absorbs the vibrations of the speaker and provides stable installation with respect to the panel member.

Preferably, the lip means is composed of at least a first lip portion formed on the opening side and a second lip portion formed at an outer cirumferential side relative to the first lip portion, with the first lip portion being formed to have a cross-sectional configuration which is a triangular configuration having a generally vertical surface on the opening side, while the second lip portion being made to have a cross-sectional configuration which is a triangular configuration having a generally vertical surface on the opposite side to the opening.

In this construction, at the speaker installation, the first lip portion is fallen (pushed) down toward the opening side while the second lip portion is pushed down toward the opposite side to the opening. Therefore, the falling directions of the respective lips are fixed, thereby preventing water or the like from entering, or preventing the damage to the seal, due to the falling direction being reversed halfway. Moreover, the first lip portion can surely prevent water or the like from entering through the opening side while the second lip portion can certainly prevent water or the like from entering through the outer circumference of the housing.

In addition, preferably, the lip means is composed of a first lip portion formed on the opening side, a second lip portion formed on an outer circumference with respect to the first lip portion, and a third lip portion formed between the first lip portion and the second lip portion, and a hole portion is made between the first lip portion and the third lip portion or between the second lip portion and the third lip portion to accept the insertion of a projection formed on the speaker housing, with the dimension of the projection in a height direction being set to be lower than the height-direction dimension of each of the lip portions before the speaker unit is mounted on the panel member.

In this case, in mounting the speaker on the panel member, the tip portion of the projection comes into contact with the panel member, thereby controlling the collapse allowance of the tip portion of each of the lip portions and preventing more falling of the lip than is necessary.

Still additionally, preferably, the cross-section of the projection is formed to have a hemispherical configuration.

With this construction, the top portion of the projection comes into contact with the panel member at the installation work, which further reduces the contact resistance at the rotation for improving the installation working efficiency.

Yet additionally, the projection is composed of a plurality of projection portions located at equal intervals on a circumference of the sealing member.

This equalizes the seal pressures due to the lip portions, thus improving the sealing performance.

Furthermore, in accordance with the present invention, there is provided a vehicle speaker comprising a speaker body and a speaker housing for holding the speaker body and covered with a cover member, wherein the speaker body is made up of a speaker cone, a cone edge formed at an outer circumference of the speaker cone and having a semi-circular configuration in cross section, a cone flange integrally formed with the cone edge at an outer circumference of the cone edge and fixedly secured to the speaker housing and an expansion portion integrally formed with the cone flange at an outer circumference of the cone flange and further protruding in an axial direction of the speaker body with respect to the cone edge.

With this construction, when the a surface of the speaker is covered with the cover member after the installation of the speaker on a vehicle, the expansion portion of the speaker body comes into contact with the cover member to function like a conventional member such as a sponge. Therefore, this eliminates the need for the member such as the sponge. Moreover, since the expansion portion is formed integrally with the speaker cone, cone flange and others of the speaker body, the positioning work becomes unnecessary, which facilities the installation work to a motor vehicle. Still moreover, since the expansion portion further protrudes than the cone edge in the axial direction of the speaker body, even if the cone edge vibrates, the cone edge does not touch the cover member, which eliminates the need for the employment of a vibration restricting member such as an arrow rubber.

In addition, preferably, on the housing, there is formed a first protruding portion which protrudes toward the interior of the expansion portion in the axial direction and on the cover member, there is formed a second protruding portion which protrudes from an opposed position to the first protruding portion toward the first protruding portion, with a gap being defined between the first and second protruding portions.

This prevents these two protruding portions from coming into contact with each other to produce vibrations and noises.

Further more, there is provided a speaker installation structure for a vehicle comprising a speaker unit including a speaker housing for holding a speaker body, said speaker housing having a plurality of claws formed thereon and a panel member having an opening and a plurality of slits made therein, said plurality of claws being inserted into said plurality of slits, respectively, and said speaker unit being mounted on said panel member by rotating said speaker housing in its circumferential direction, characterized in that said opening has a diameter smaller than a diameter of said speaker housing and has at least three linear portions, and each of said plurality of slits is made outside said three linear portions and inside an outer circumference of said speaker housing, and a plurality of indentations are made in an outer circumference of said speaker housing, and a connector to be connected to a harness terminal for power supply to said speaker body is placed on said speaker housing, and an elastic piece, made to be elastically deformed by said panel member in a direction opposite to said panel member when said claws are inserted into said slits and returned to the panel member side when said speaker housing is rotated up to a predetermined position, is formed on said connector, with said harness terminal being connectable to said connector only when said elastic piece is returned to the panel member side.

BRIEF DESCRIPTION OF THE DRAWINGS

FIG. 10b is a cross-sectional view taken along a line R—R of FIG. 10a;

FIG. 12 is a top view illustratively showing the speaker unit on the vehicle speaker installation structure according to the embodiment of the present invention;

FIG. 21a is an illustration useful for explaining the effects of a connector in the vehicle speaker installation structure according to the embodiment of the present invention;

FIG. 21b is an illustration useful for explaining the effects of a connector in the vehicle speaker installation structure according to the embodiment of the present invention;

FIG. 22 is an enlarged cross-sectional view illustratively showing a configuration of a sealing member in the vehicle speaker installation structure according to the embodiment of the present invention;

BEST MODES FOR CARRYING OUT THE INVENTION

Figure 1:
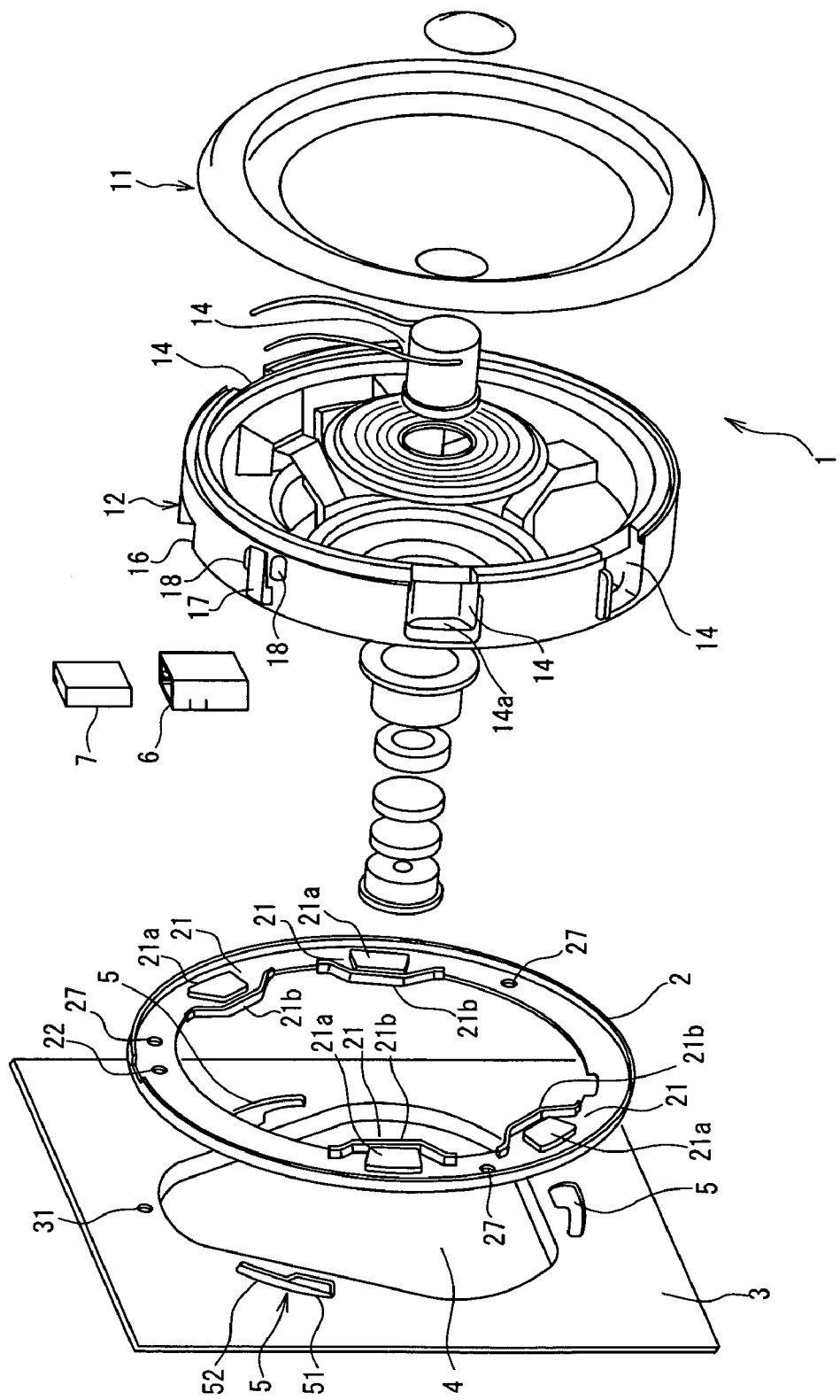
FIG. 1 is an exploded perspective view illustratively showing a construction of an essential part of an installation structure for a speaker for a vehicle according to an embodiment of the present invention, viewed from the front side of the speaker.
Figure 2:
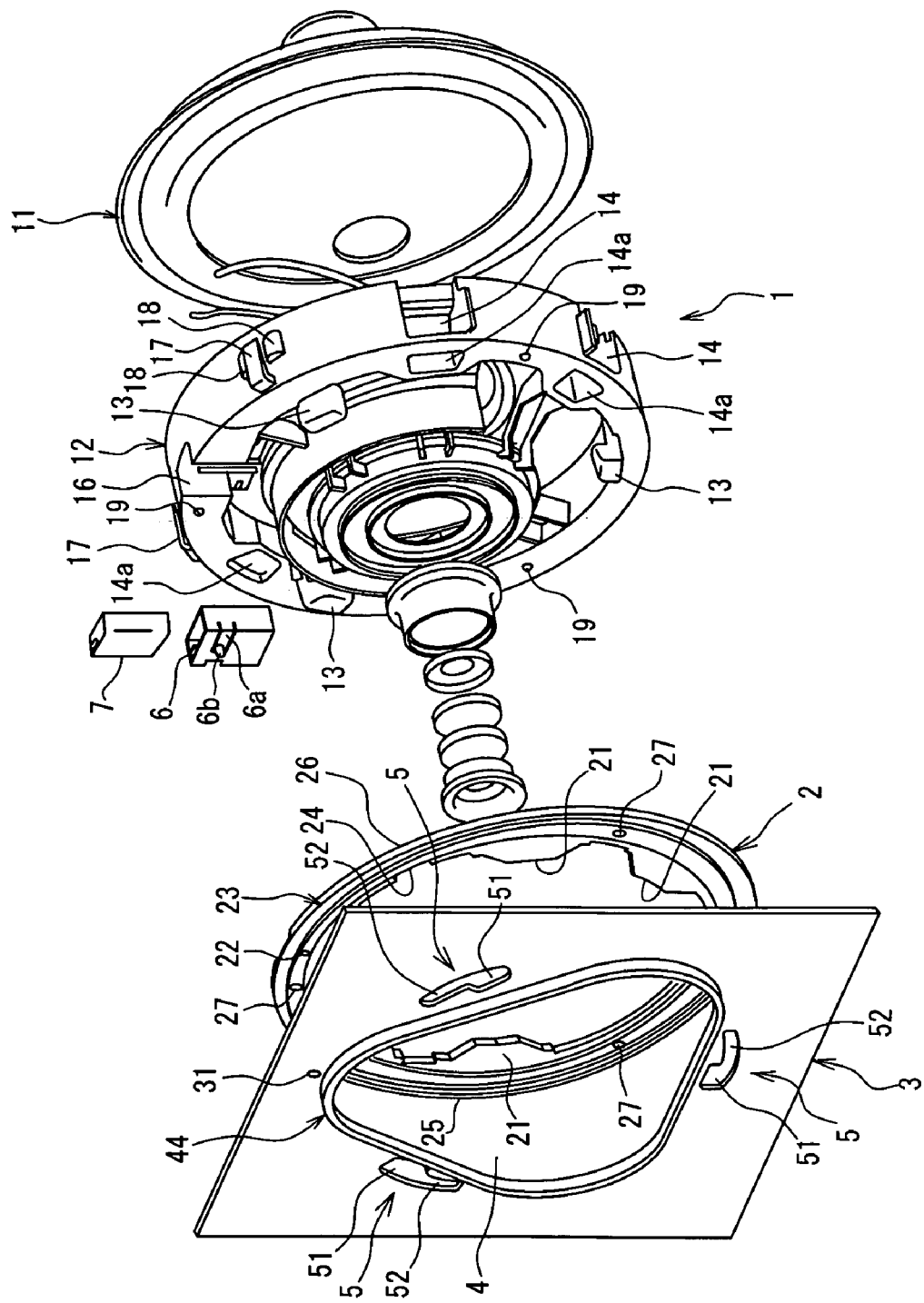
FIG. 2 is an exploded perspective view illustratively showing a construction of an essential part of the installation structure for a speaker for a vehicle according to the embodiment of the present invention, viewed from the back side of the speaker.
Figure 3:
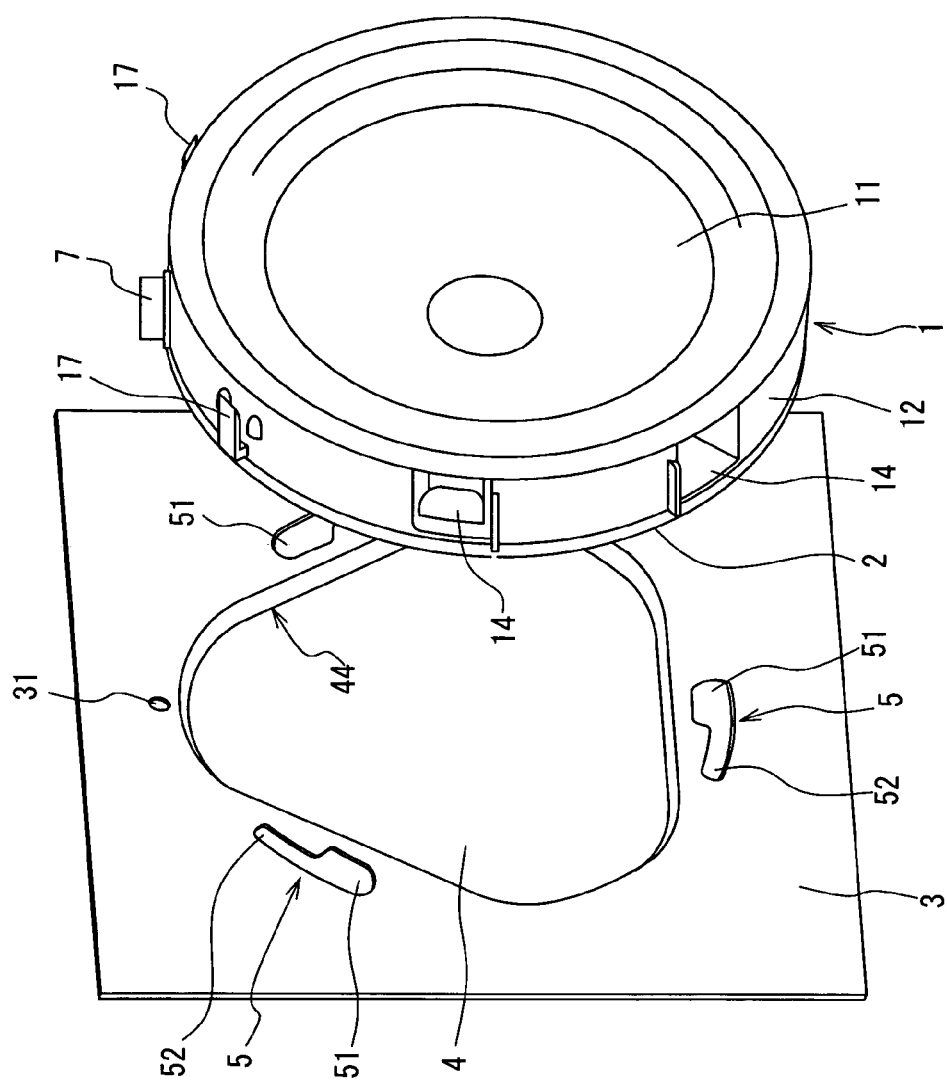
FIG. 3 is an illustrative view showing a state immediately before the installation of a speaker in the vehicle speaker installation structure according to the embodiment of the present invention.
Figure 4:
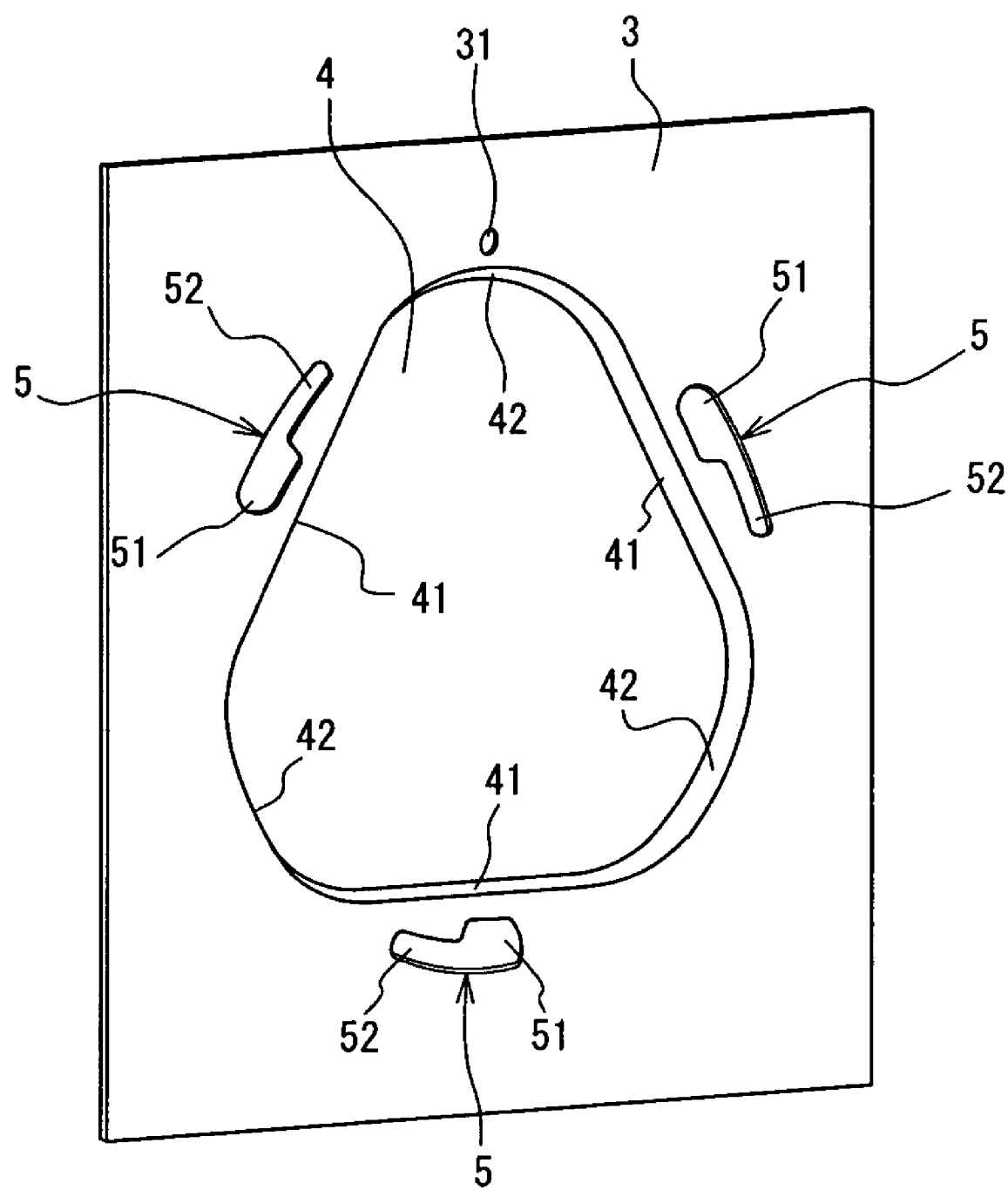
FIG. 4 is an illustrative view showing a panel member in the vehicle speaker installation structure according to the embodiment of the present invention.
Figure 5:
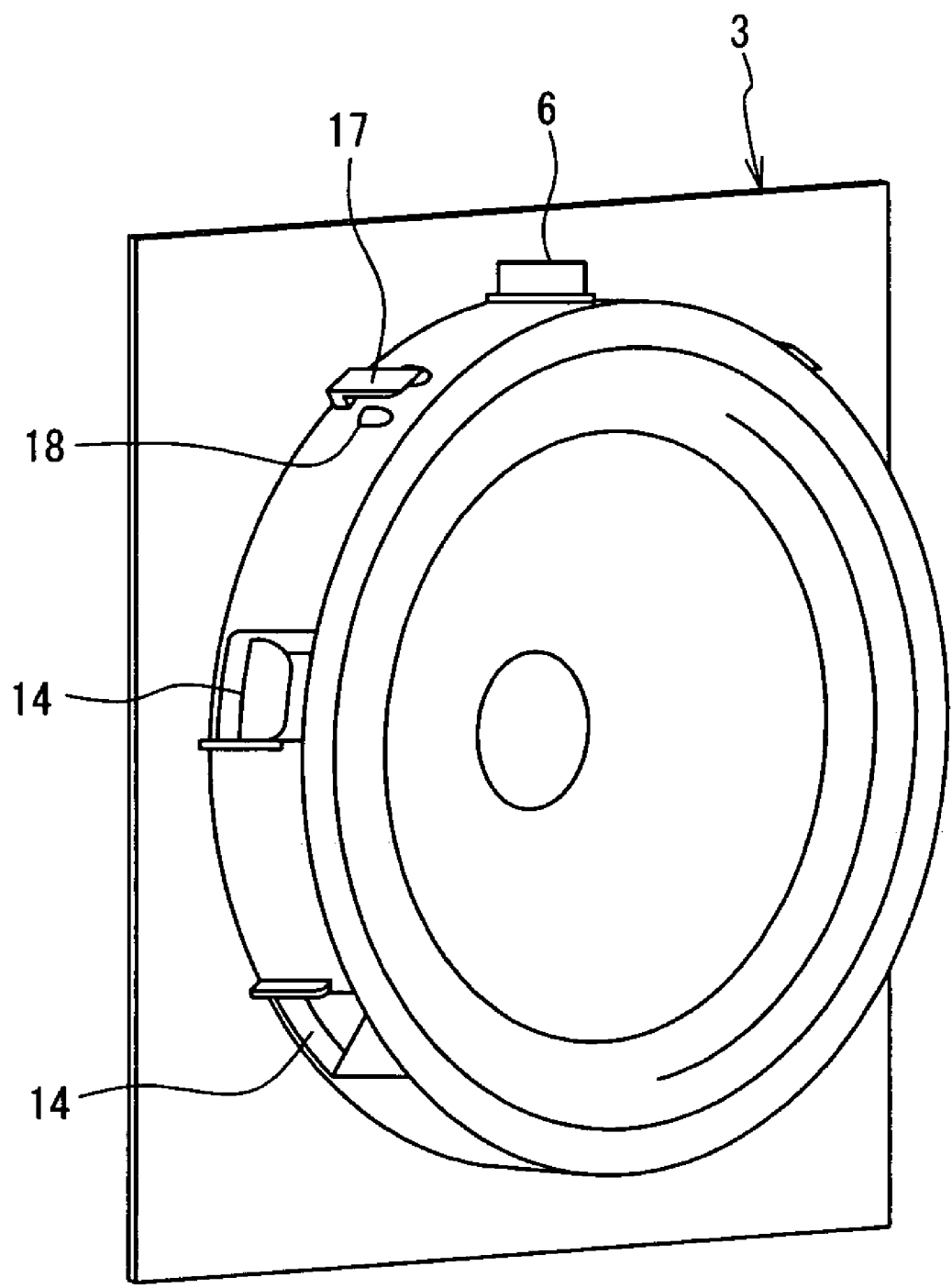
FIG. 5 is an illustrative view showing a state after the installation of a speaker in the vehicle speaker installation structure according to the embodiment of the present invention, viewed from the front side of the speaker.

An embodiment of the present invention will be described hereinbelow with reference to the drawings. In FIGS. 1 to 3, reference numeral 1 designates a speaker unit, numeral 2 represents a sealing member, and numeral 3 denotes a door inner panel acting as a panel member. The speaker unit 1 is mainly composed of a speaker body (which will hereinafter be referred to simply as a "speaker") 11 and a speaker housing (which will hereinafter be referred to simply as a "housing") 12 for holding the speaker 11, with functional parts such as coils being held in the housing 12.

In addition, in this embodiment, the housing 12 is made of a resin as one-body construction, and as shown in FIGS. 2, 8, 9 and 14, on the rear surface side of the housing 12, there are formed a plurality of claws 13 for fixedly securing the speaker unit 1 to the door inner panel 3.

Still additionally, as FIGS. 1 to 3 show, in the door inner panel 3 on which the speaker unit 1 is mounted, there is made an opening 4, and around this opening 4, there are made slits 5 corresponding in position to the claws 13. The claws 13 and the slits 5 are formed at 120-degree phase intervals with respect to the center of the speaker unit 1.

Figure 6:
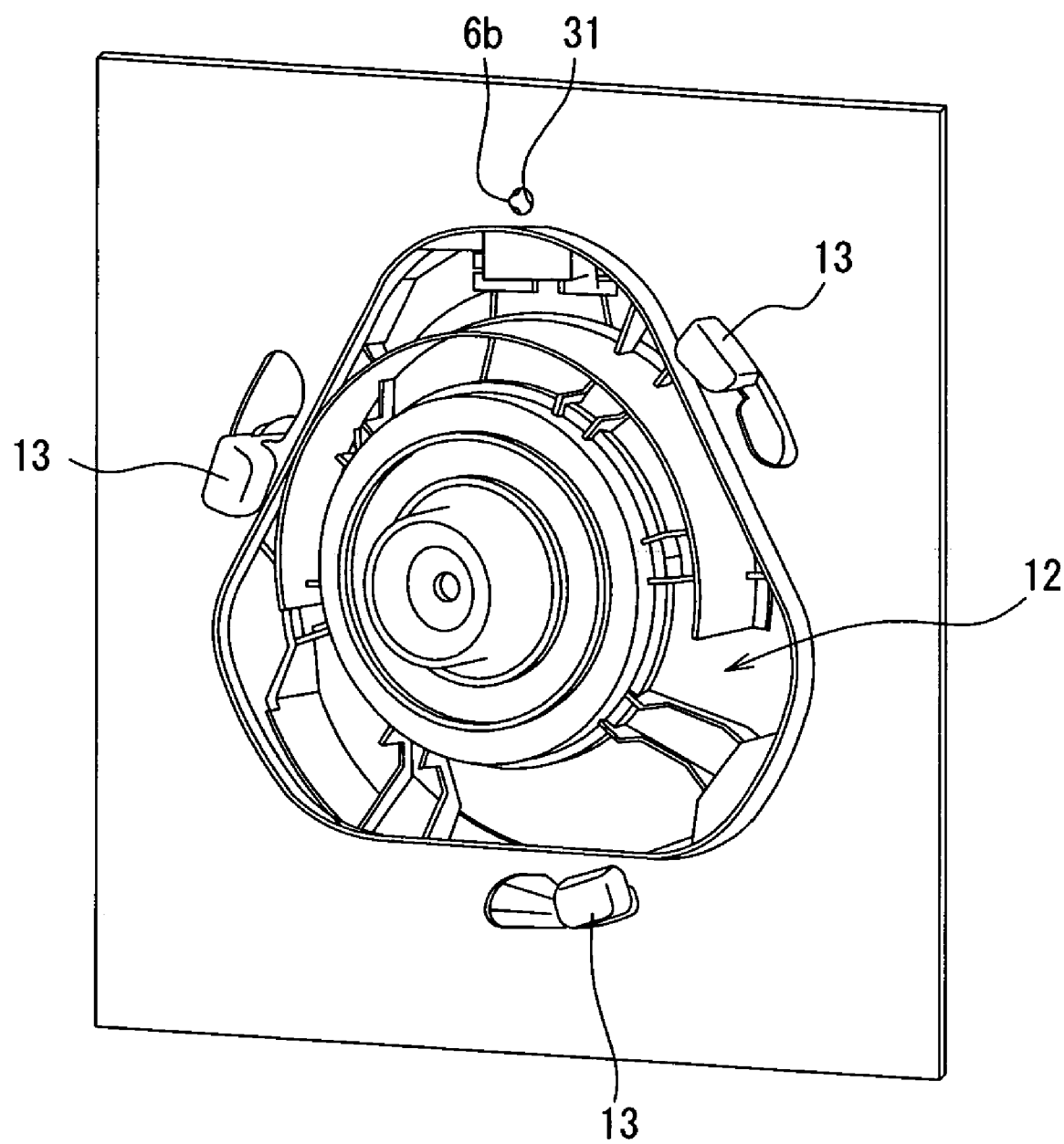
FIG. 6 is an illustrative view showing a state after the installation of a speaker in the vehicle speaker installation structure according to the embodiment of the present invention, viewed from the back side of the speaker.

When the housing 12 is rotated in its circumferential direction after the claws 13 of the housing 12 are inserted into the slits 5, respectively, the speaker unit 1 is fixedly secured to the door inner panel 3 as shown in FIG. 6.

Figure 10A:
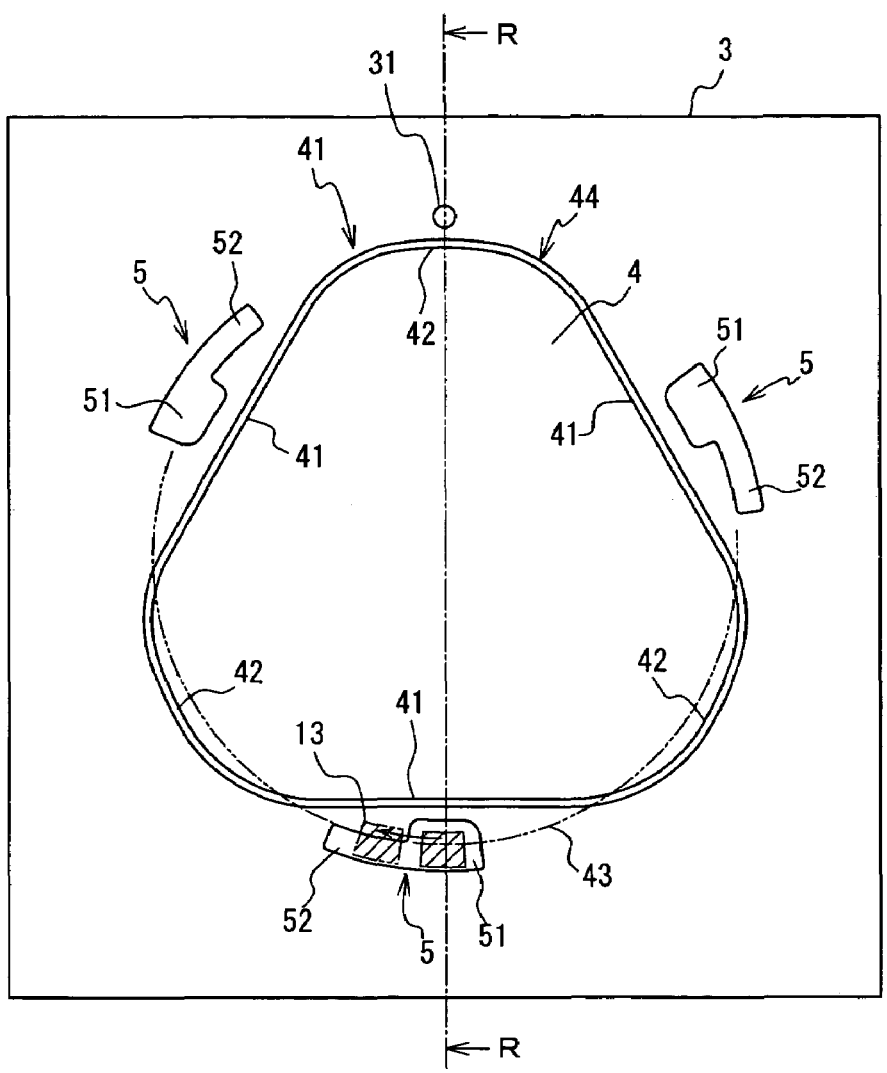
FIG. 10a is a plan view illustratively showing a panel member in the vehicle speaker installation structure according to the embodiment of the present invention.

A detailed description will be given hereinbelow. This opening 4 is made to have a diameter smaller than the outer diameter of the speaker housing 12. Moreover, the opening 4 is made to have a generally triangular configuration as shown in FIGS. 1 to 4 and 10a. Concretely, as shown in FIG. 10a, this opening 4 has three linear portions 41 which are connected to each other through curves (for example, circular arc) 42. The reason that the opening 4 is formed into this triangular configuration will be mentioned later.

Figure 10B:
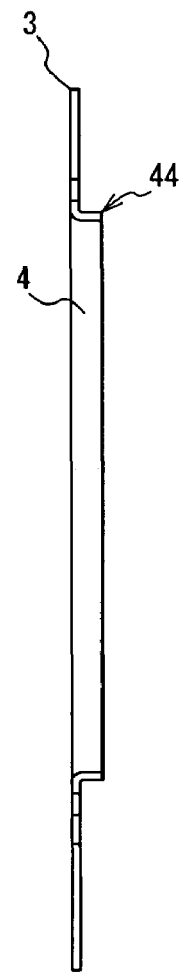

In addition, as FIGS. 10a and 10b show, at edge portions of the opening 4, flanges 44 are formed by bending the edge portions perpendicularly. The formation of the flanges 44 achieves the improvement of the rigidity of the opening 4.

Figure 8:
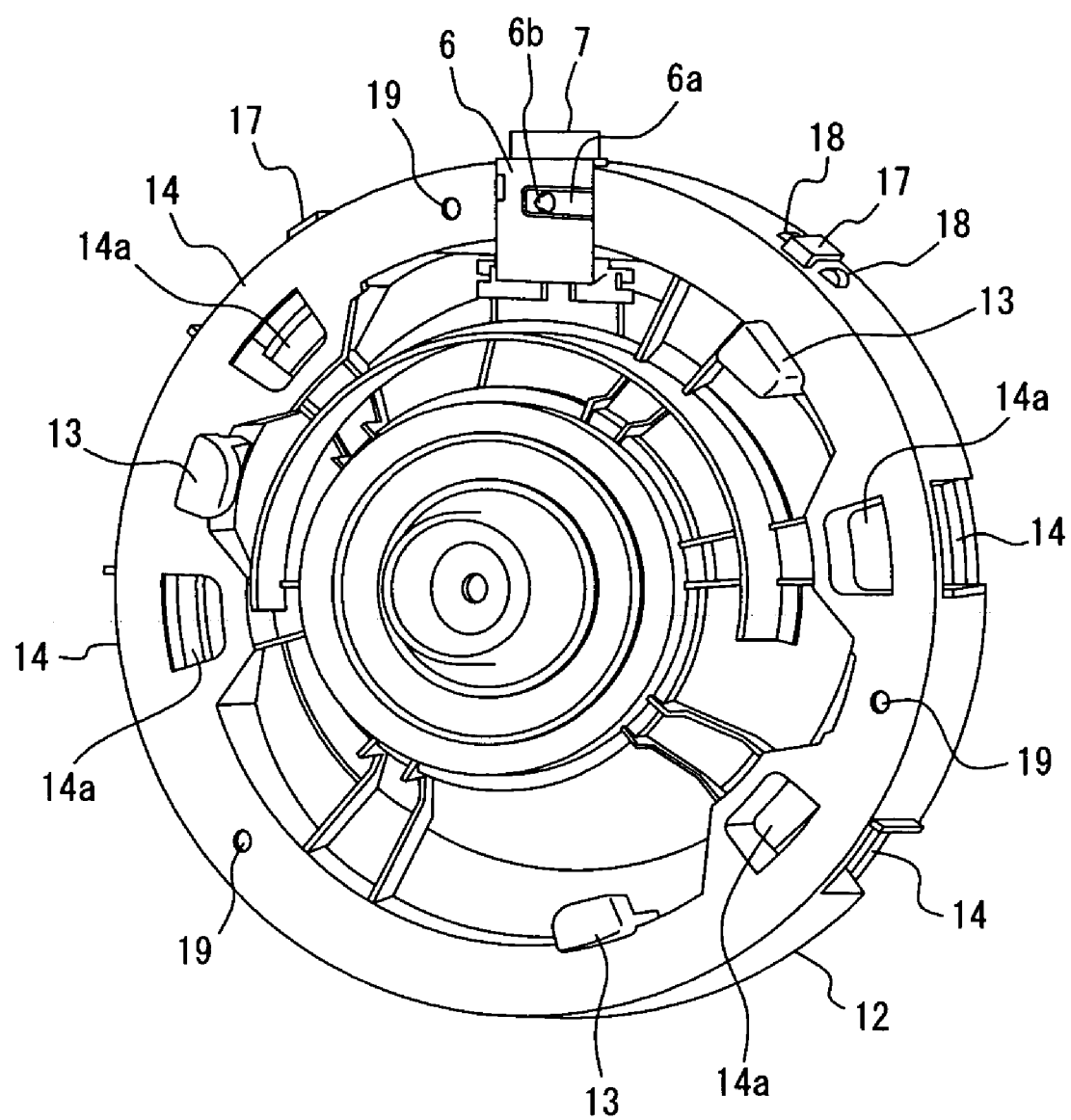
FIG. 8 is an illustrative view showing a configuration of the speaker housing in the vehicle speaker installation structure according to the embodiment of the present invention, viewed from the back side.

Still additionally, the slits 5 are situated outside the three linear portions 41, and the slits 5 and the claws 13 are made inside an outer-diameter circle (outer circumference) of the speaker housing 12 as shown in FIGS. 2 and 8.

Figure 19:
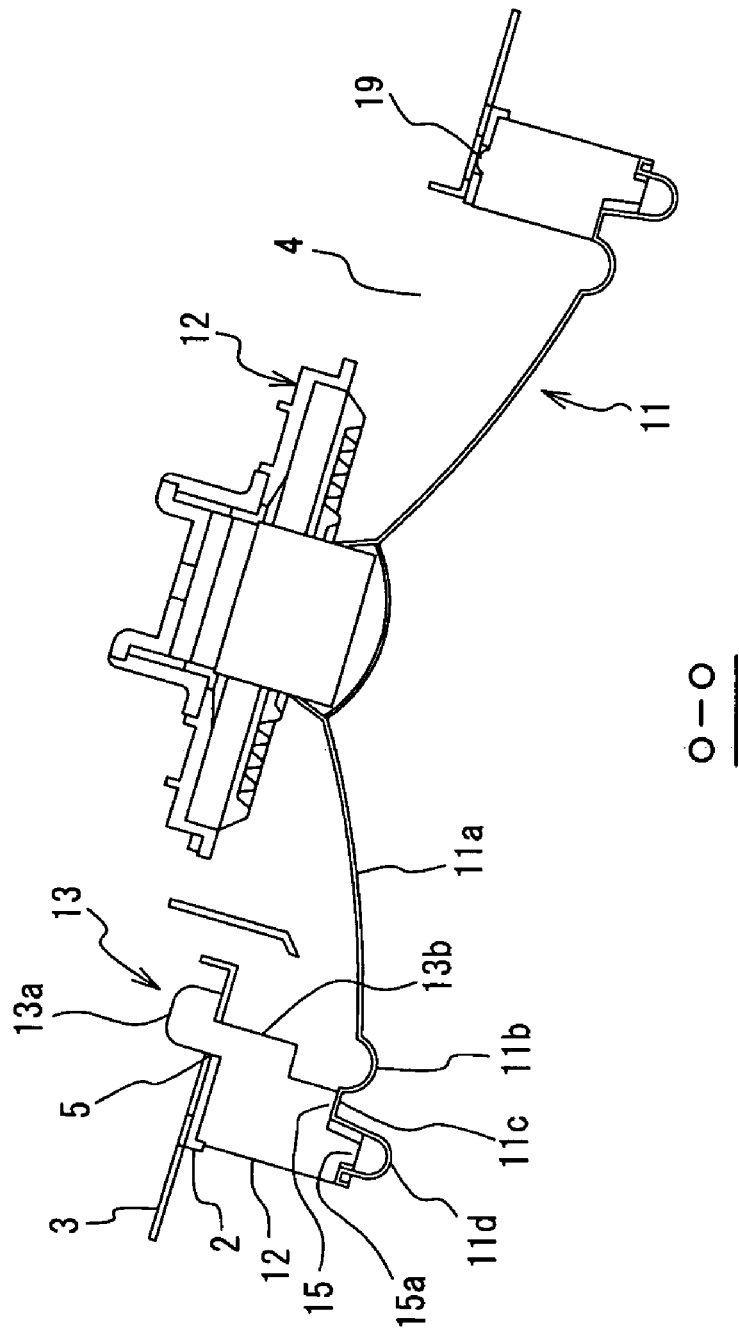
FIG. 19 is a cross-sectional view illustratively showing the speaker unit on the vehicle speaker installation structure according to the embodiment of the present invention, and is a cross-sectional taken along a line O—O of FIG. 14.

On the other hand, as FIG. 19 shows, each of the claws 13 is composed of a tip portion 13a bent inwardly (that is, bent toward the opening 4 side in an installed state of the speaker unit 1) and an arm portion 13b made to make a connection between the tip portion 13a and the housing 12, with the cross section thereof being formed into a generally L-shaped configuration.

Moreover, as FIG. 10a shows, each of the slits 5 is composed of a first slit portion 51 accepting the insertion of the tip portion 13a of the claw 13 and a second slit portion 52 connected to the first slit portion 51 and accepting the insertion of only the arm portion 13b.

In the work for the installation of the speaker unit 1, the tip portion 13a of each of the claws 13 is inserted into each of the first slit portions 51 and, following this, the speaker unit 1 is rotated to shift the arm portion 13b to the interior of the second slit 52 so that the claw 13 engages with the slit 5 to fixedly secure the speaker unit 1 to the door inner panel 3. Moreover, a protruding portion 6b of a connector 6, which will be mentioned later, is coupled with a recess portion 31 made in the door inner panel 3, thereby placing the speaker unit 1 in a locked condition with respect to the door inner panel 3.

Secondly, a description will be given hereinbelow of the reason that the opening 4 is not formed into a circular configuration but being formed into a triangular configuration. The reason is that, after the installation of the speaker unit 1, the claws 13 are brought close to the flanges 44 to the utmost and engaged therewith.

In a case in which the opening 4 has a circular configuration, the rotating locus 43 (see FIG. 10a) of the claws 13 of the speaker unit 1 and the opening 4 are in concentric relation to each other so that the rotating locus 43 and the edge of the opening 4 becomes parallel to each other. On the other hand, in this embodiment, the rotating locus 43 are perpendicular to an extension of each of the linear portions 41. Accordingly, in accordance with the rotation of the speaker unit 1, the distance between the claws 13 and the linear portions 41 varies.

In particular, in this embodiment, the first slit portions 51 are made at positions where the distances between the linear portions 41 and the rotating locus 43 show a maximum, and, in mounting the speaker unit 1, when the housing 12 is rotated after the insertion of the claws 13, the claws 13 approach the edge portions of the opening 4, that is, the flanges 44.

If the engagement of the claws 13 takes place at positions near the flanges 44 in this way, the installation rigidity of the speaker unit 1 becomes improvable.

That is, so far, in order to enhance the speaker installation rigidity, it has been desired that the slits are brought as close to the flanges as possible. This is because the flange portion has the highest surface strength and the rigidity decreases toward the periphery. However, on processing, limitation is imposed on the slit being brought close to the flange and, hence, there is a need to establish some degree of distance between the flange and the slit, so difficulty is experienced in enhancing the installation rigidity.

In addition, considering the acoustic characteristic of the speaker, it has been desired that the area of the opening is set to be as large as possible.

Therefore, in the vehicle speaker installation structure according to the present invention, the opening 4 is not formed into a circular configuration but being formed into a triangular configuration, thereby solving the above-mentioned problems. That is, in a case in which the opening 4 is formed into a triangular configuration as mentioned above, even if the distance between the slit 5 and the flange 44 is set to be long, the claw 13 can be brought close to the edge portion of the opening 4, i.e., the flange 44 in a manner that the speaker unit 1 is rotated at the installation of the speaker unit 1. This enables the engaging section to approach the flange 44, thus achieving the enhancement of the installation rigidity.

Add to it that the formation of the opening 4 having a triangular configuration enlarges the opening area to prevent the degradation of the acoustic characteristic of the speaker.

Figure 7:
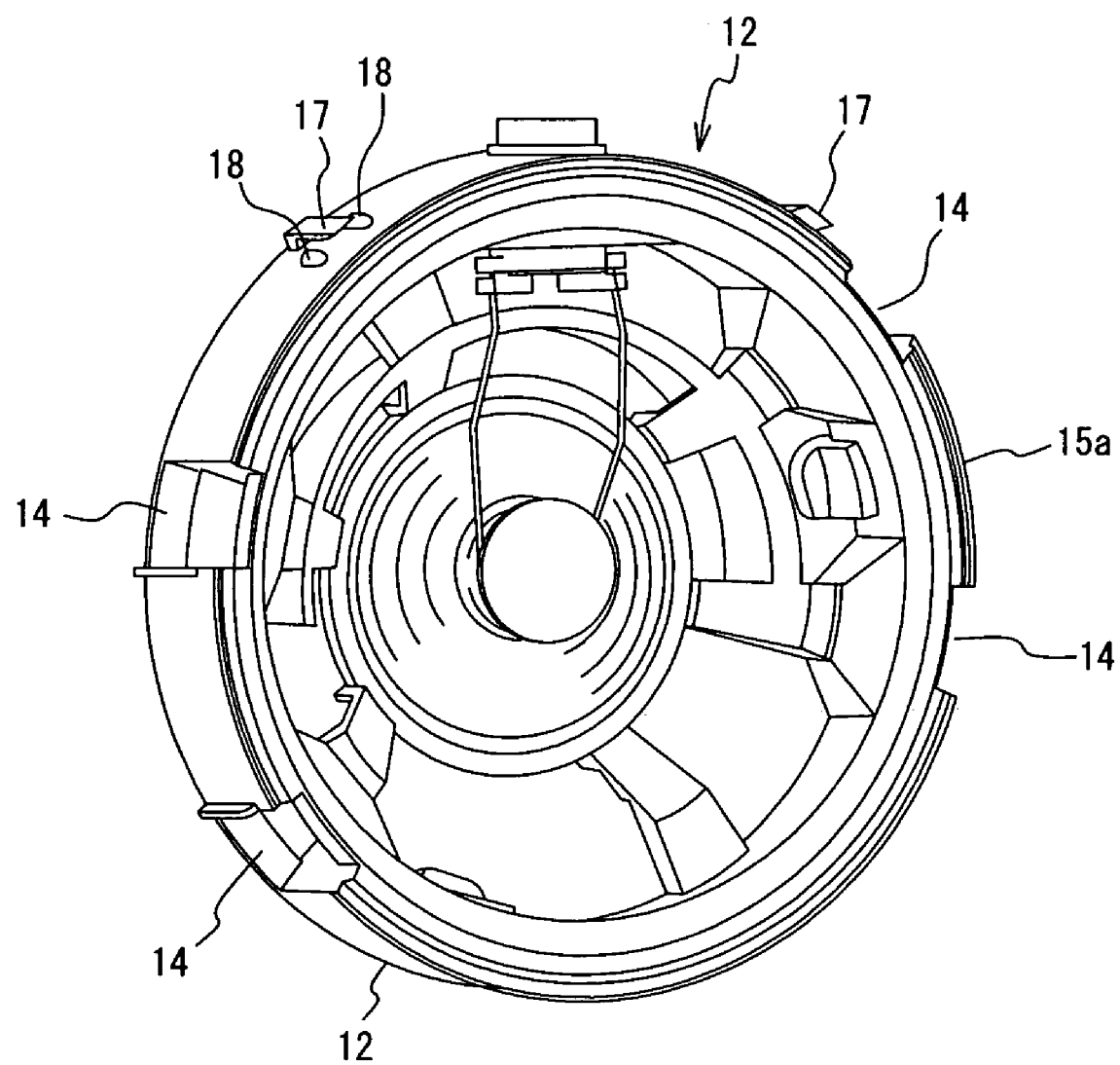
FIG. 7 is an illustrative view showing a configuration of a speaker housing in the vehicle speaker installation structure according to the embodiment of the present invention, viewed from the front side.

Meanwhile, a plurality of indentations 14 are made in an outer circumferential portion of the housing 12 as shown in FIGS. 1 to 3, 5, 7 to 9, 12 and 13. These indentations 14 are provided for a worker to hold the housing 12 securely at the installation work, and each of the indentations 14 has a configuration depressed or indented radially at the outer circumferential portion of the housing 12. Moreover, in this embodiment, these indentations 14 are formed at four places as shown in FIG. 7, and are located symmetrically with each other with respect to the center of the speaker unit 1.

At the installation work, a worker can securely hold the speaker unit 1 in a state where his/her fingers are put in the indentations 14 and, hence, can easily rotate the speaker unit 1 at the installation work to the door inner panel 3. This eliminates the need for the size increase of the speaker unit 1 for the purpose of improving the working efficiency, and does not require special tools for the rotation of the speaker unit 1. Moreover, since these indentations 14 are situated symmetrically with respect to the center of the speaker unit 1, the worker can easily hold the housing 12 by both his/her hands, thus contributing to further improvement of the working efficiency.

Furthermore, with reference to FIG. 17, a brief description will be given hereinbelow of a method of forming (molding) the indentations 14. In this case, the housing 12 is made of a resin as one-body construction as mentioned above, and in general, for forming the indentations 14 indented radially in the resin-made housing 12, there is a need to use a mold to be drawn radially (which is referred to as a "slide mold").

Usually, in the case of the employment of such a slide mold, at least one slide mold is necessary, and this mold is shifted in a radial direction to conduct the mold drawing operation.

Accordingly, in a case in which the indentations 14 on the circumference are four in number as in the case of this embodiment, there is a need for a slide mold for making each of the identations 14. What's more, not only the slide molds, but also axially drawn molds are necessary. Therefore, in the case of the formation using such slide molds, the number of manufacturing steps increases, which leads to an increase in cost.

For this reason, according to this embodiment, without using the slide molds, two molds movable axially in opposite directions are used to form the housing 12 having the claws 13 and the indentations 14 integrally, regardless of the number of identations 14. This construction reduces the number of manufacturing steps and achieves the cost reduction.

Figure 17:
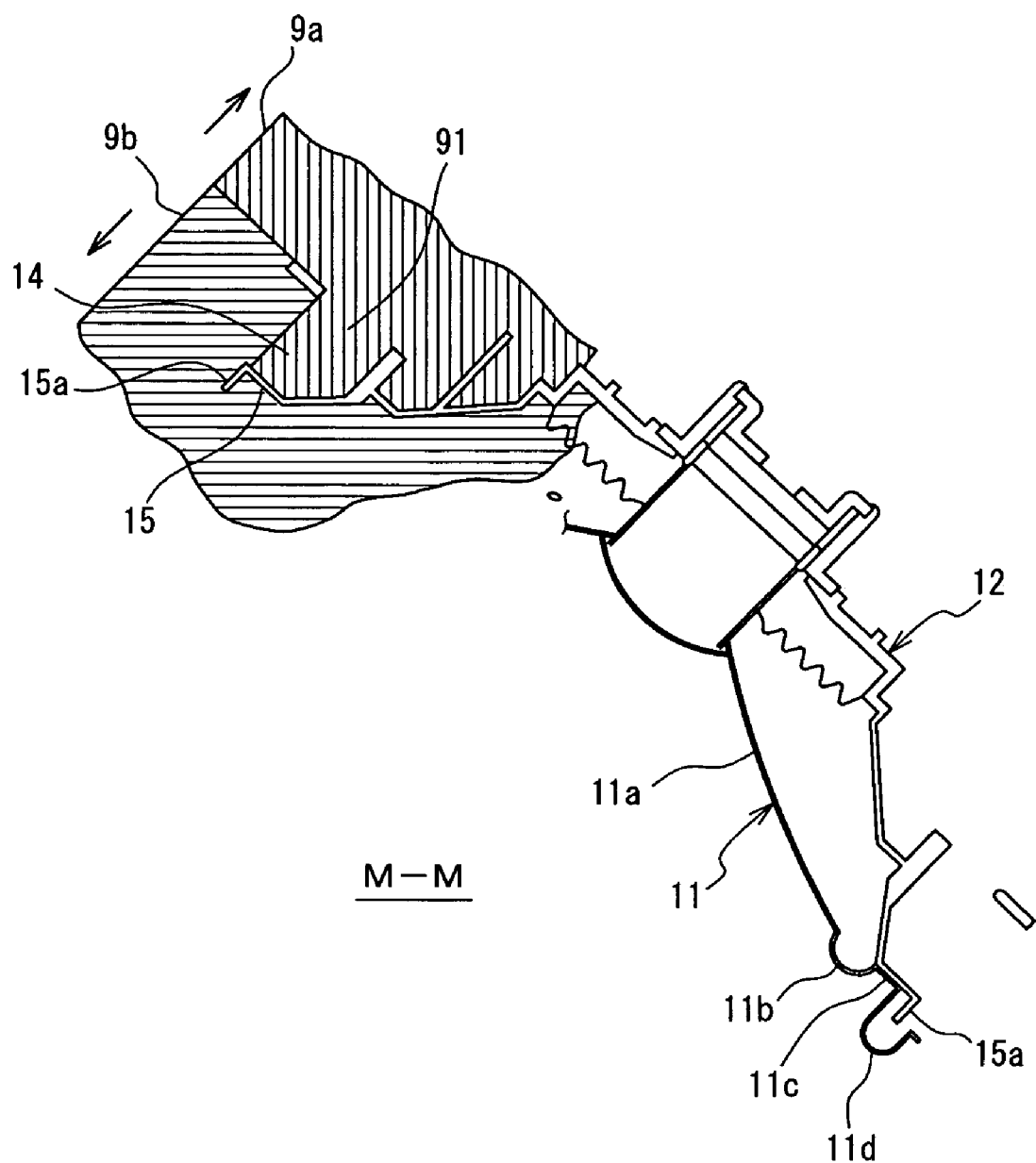
FIG. 17 is a cross-sectional view illustratively showing the speaker unit on the vehicle speaker installation structure according to the embodiment of the present invention, and is a cross-sectional taken along a line M—M of FIG. 14.
Figure 18:
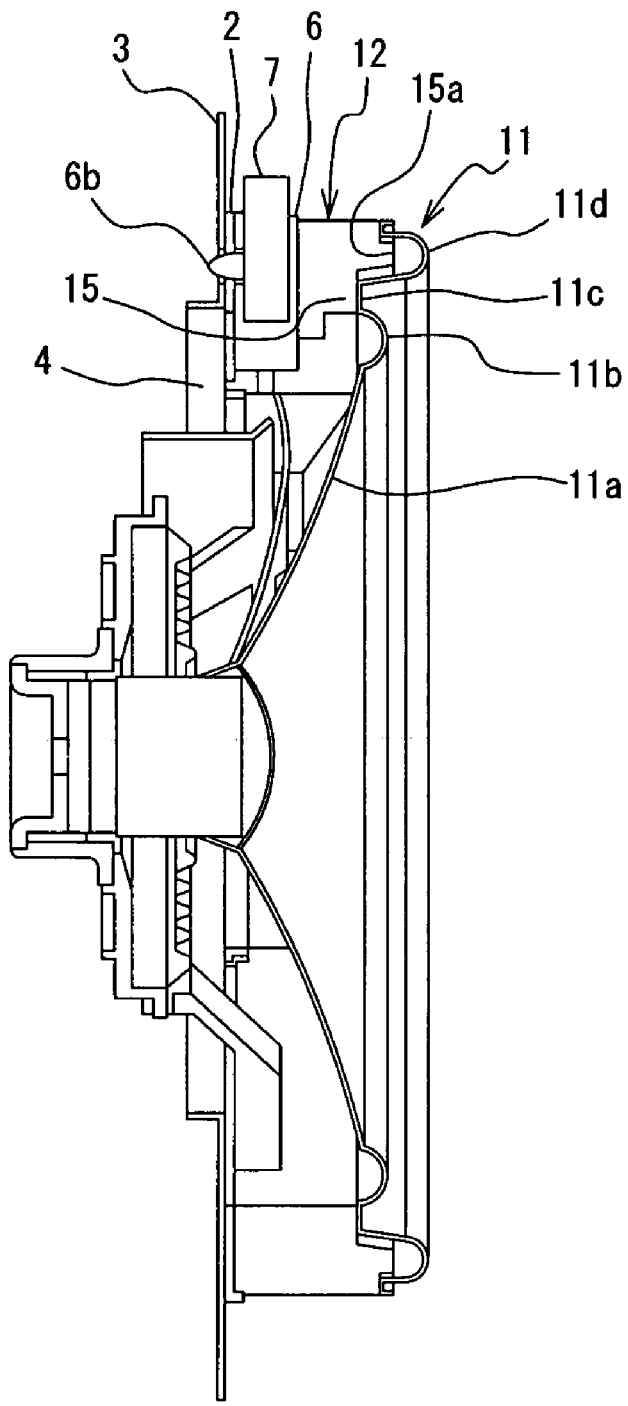
FIG. 18 is a cross-sectional view illustratively showing the speaker unit on the vehicle speaker installation structure according to the embodiment of the present invention, and is a cross-sectional taken along a line N—N of FIG. 14.

Concretely, as FIG. 17 shows, the housing 12 is formed through the use of a first mold 9a and a second mold 9b placed on the opposite side to the first mold 9a.

The first mold 9a principally forms a configuration on the back side of the housing 12 while the second mold 9b mainly forms a configuration on the front side of the housing 12.

Moreover, as FIGS. 2 and 8 show, openings 14a open to the inside of the housing 12 in its axial direction (that is, to the door inner panel 3 side) are made in the indentations 14 of the housing 12 in parallel with an axial direction of the speaker 11.

Through the formation of these openings 14a, the housing 12 can be formed by the two molds 9a and 9b drawable in the axial directions. That is, as FIG. 17 shows, the first mold 9a has an extension 91 extending from the flange portion 15 of the housing 12 in an axial direction of the housing 12 to pass through the opening 14a and this extension 91 defines the configuration of the indentation 14.

The second mold 9b extends from the flange portion 15 in an outer circumferential direction. When these molds 9a and 9b are drawn axially in the opposite directions, the circular housing 12 having the cavities (indentations) 14 on the outer circumferential side can be formed without using slide molds, and the housing 12 can be manufactured at a low cost.

Furthermore, a description will be given hereinbelow of the speaker 11. As FIGS. 16 to 19 show, the speaker 11 includes a speaker cone 11a and a cone edge 11b formed at an outer circumference of the speaker cone 11a to have a semi-circular configuration in cross section. In addition, a cone flange 11c integrally formed with the cone edge 11b is placed at an outer circumferential edge of the cone edge 11b, with the cone flange 11c being fixedly secured through an adhesive or the like to a flange portion 15 of the housing 12.

Moreover, an expansion portion 11d is formed at an outer circumference of the cone flange 11c. This expansion portion 11d is formed integrally with the cone flange 11c to protrude in an axial direction of the speaker with respect to the cone edge 11b as shown in FIGS. 16 to 19.

An edge portion (first protruding portion) 15a planted on the outer circumferential side of the flange portion 15 of the housing 12 is covered with the expansion portion 11d. This edge portion 15a is formed to protrude toward the top of the expansion portion 11d.

Figure 20:
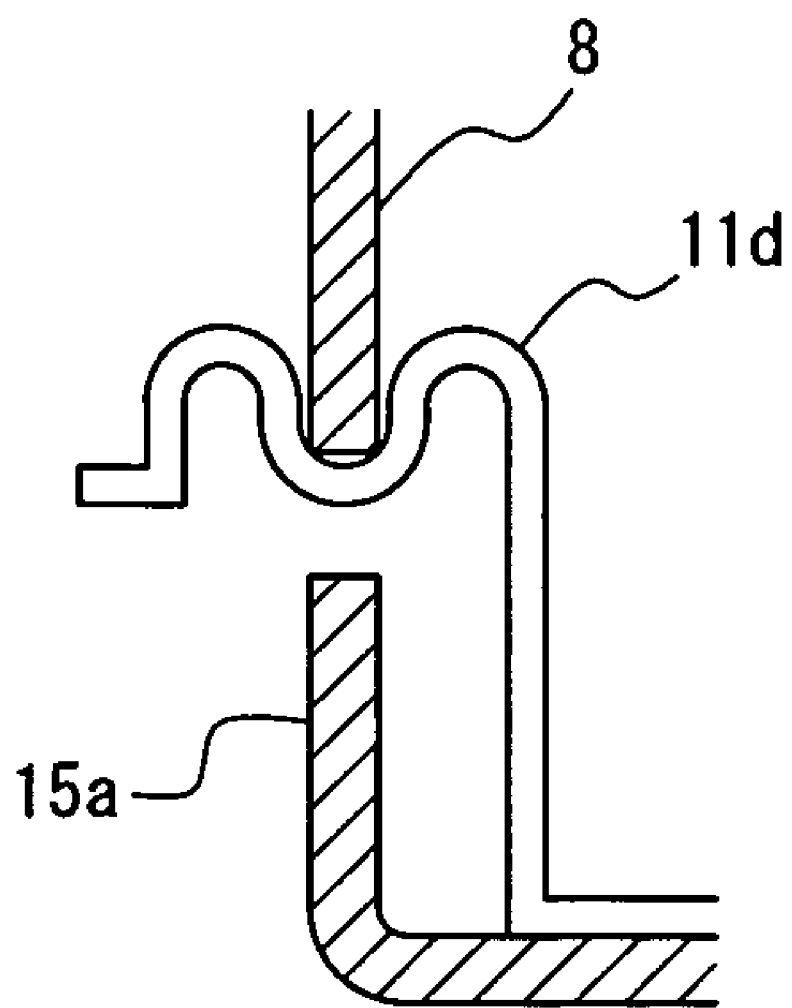
FIG. 20 is a cross-sectional view illustratively showing a state after the installation of a speaker on the vehicle speaker installation structure according to the embodiment of the present invention.
Figure 23:
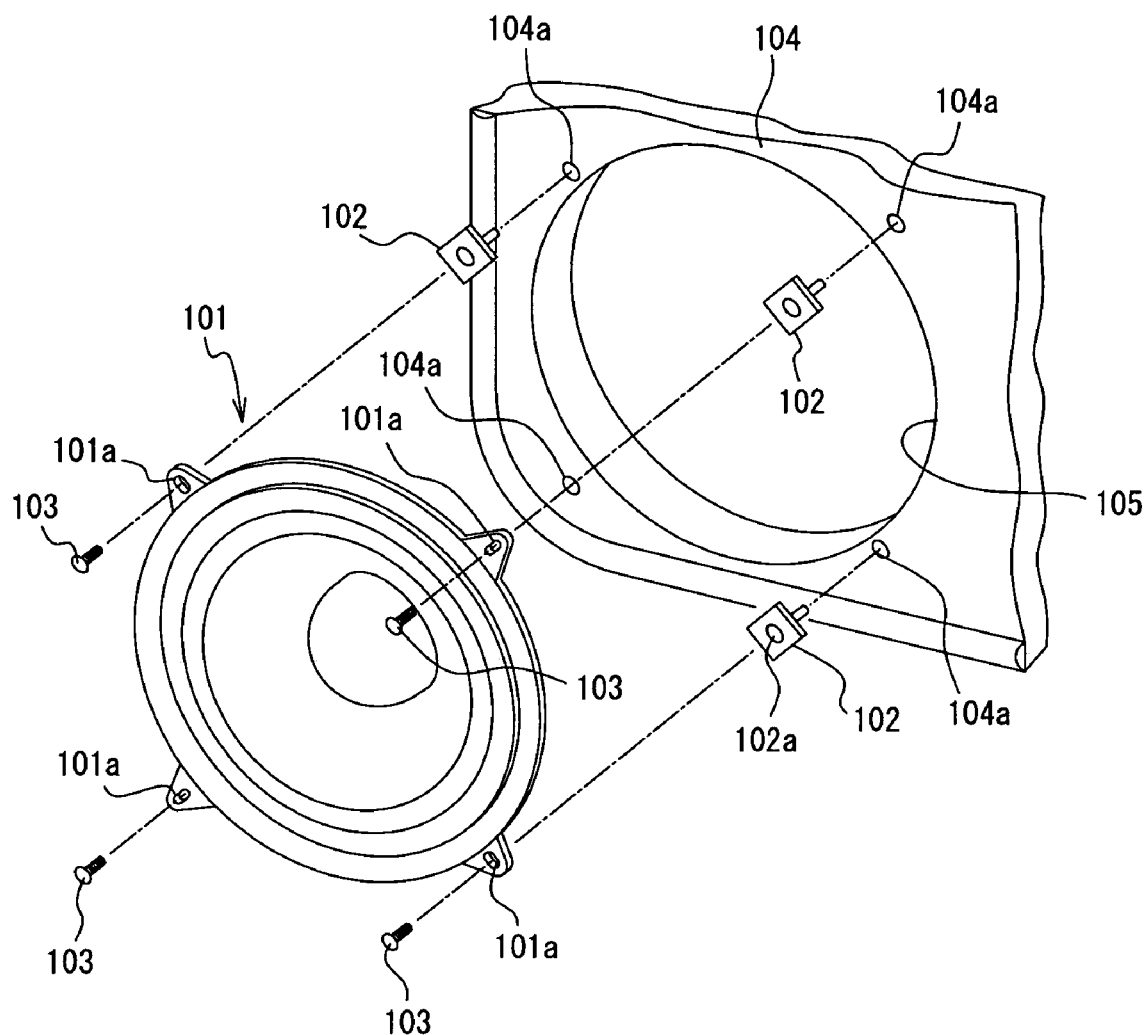
FIG. 23 is an illustrative view for explaining one example of a conventional vehicle speaker installation structure.
Figure 24:
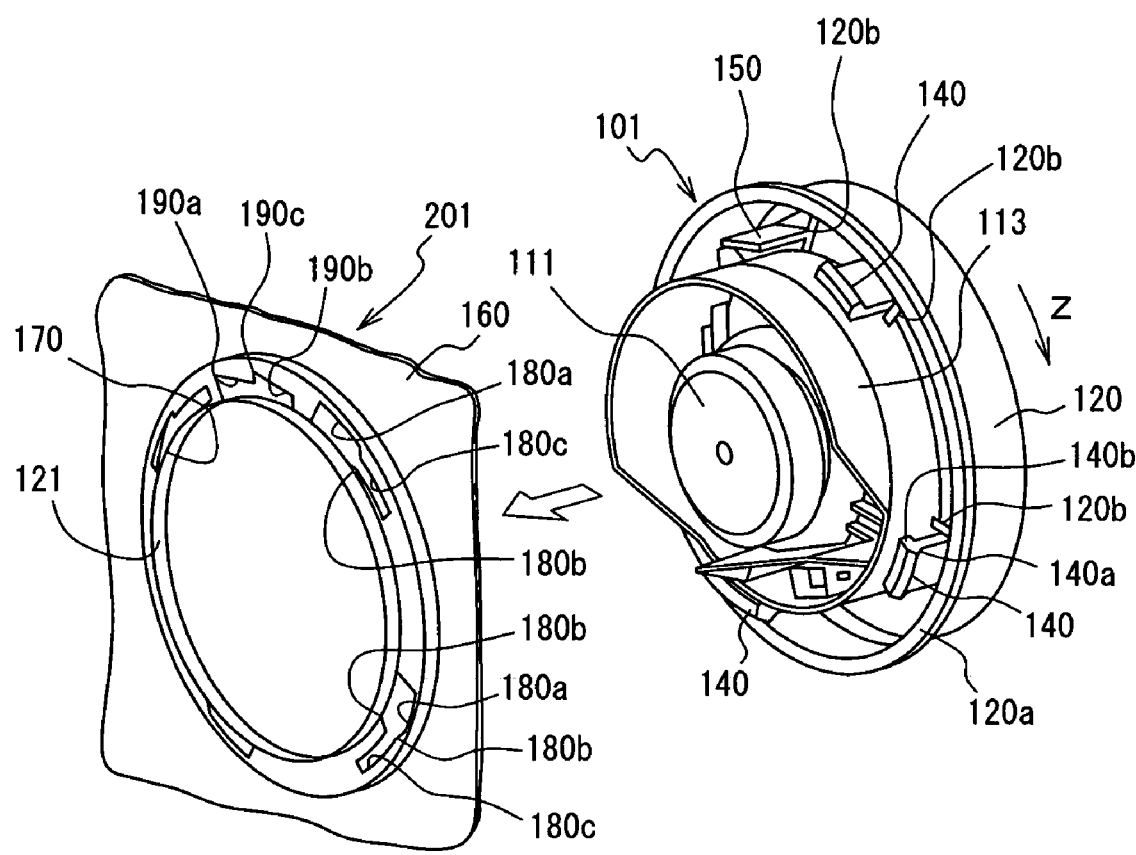
FIG. 24 is an illustrative view for explaining another example of a conventional vehicle speaker installation structure.

On the other hand, after mounted on the door inner panel 3 of a vehicle, the speaker 11 is covered with a door inner trim (cover member). Moreover, as FIG. 20 shows, in the door inner trim, at a position which is in opposed relation to the aforesaid edge portion 15a, a trim flange (second protruding portion) 8 is formed to protrude toward the edge portion 15a, and when the door inner trim is attached, the expansion portion 11d of the speaker 11 is pressed down by the trim flange 8 in an axial direction as illustrated.

At this time, a gap is defined between the edge portion 15a and the trim flange 8 as illustrated. That is, the sizes of the edge portion 15a and the trim flange 8 are set so that the edge portion 15a and the trim flange 8 do not come into contact with each other in an ordinary condition (or a static condition).

With this construction, the expansion portion 11d is pushed down by the trim flange 8 to crush the tip portion of the expansion portion 11d so that the expansion portion 11d comes closely into contact with the trim flange 8.

If a gap exists between the door inner trim (which will be referred to hereinafter as a "door trim") and the speaker 11, sound leaks through the gap, or the expansion portion 11d and the door trim interfere with each other to generate trembling sound or the like. If the expansion portion 11d is brought closely into contact with the door inner panel side, these problems are solvable.

Incidentally, so far, without using such a trim flange 8, a sponge or the like has been formed instead. However, the adhesion of the sponge to the trim is troublesome, which causes an increase in cost. On the other hand, according to this embodiment, the formation of the trim flange 8 eliminates the need for the sponge material and reduces the number of parts, coupled with improving the working efficiency and reducing the cost.

In addition, it is also considered that the expansion portion 11d is pressed directly by a trim surface without forming the trim flange 8. However, with this construction, the speaker cone 11a approaches the trim surface.

However, in the case of the door trim, since the passenger's foot, knee or the like easily touch the trim, if the speaker cone 11a is placed close to the trim surface, the speaker cone 11a is pressed by the door trim, so there is a possibility of resulting in damages to the speaker 11.

If the expansion portion 11d is made to have a high height, this problem is avoidable. However, since the door trim is constructed with an elastic member, difficulty is encountered in completely avoiding the contact between the door trim and the speaker cone 11a, and since limitation is imposed on the mounting position of the speaker 11, it is of no practical use.

Therefore, according to this embodiment, the expansion portion 11d and the trim flange (second protruding portion) 8 are provided, and the edge portion (first protruding portion) 15a protruding toward the trim flange 8 side is formed at a position facing the trim flange 8 in the housing 12, and even if the trim is pushed to the speaker cone 11a side, the trim flange 8 and the edge portion 15a come into contact with each other before the trim surface and the cone edge 11b come into contact with each other, thus preventing further deformation of the trim.

Moreover, a vibration limiting member such as an arrow rubber has so far been adhered to a side portion of the cone edge 11b to prevent the cone edge 11b from touching the door inner trim (or cover member) even if the cone edge 11b vibrates, whereas the trim surface is located at a position further separated as compared with the trim flange 8 and, even if the trim surface is deformed to approach the cone edge 11b, the trim flange 8 and the edge portion 15a first come into contact with each other to prevent further deformation. This eliminates the need for the additional employment of the arrow rubber, thereby providing a simple construction.

Still moreover, since the trim flange 8 and the edge portion 15a are separated to form a predetermined gap in an ordinary condition, both do not come into contact with each other and, hence, do not generate vibrations and noises.

Yet moreover, since the expansion portion 11d is formed integrally with the speaker cone 11a and the cone edge 11b, there is no need to conduct special positioning at the installation work.

Meanwhile, as FIGS. 1 and 2 show, the rubber-made sealing member 2 is interposed between the door inner panel 3 and the speaker unit 1, and a closing piece 21 is formed on the sealing member 2 to close the opening 14a of each of the indentations 14 made in the housing 12.

After the installation of the speaker unit 1, the opening 14a of the indentation 14 is closed by the closing piece 21, thereby cutting off an air flow going through this opening 14a to improve the sound quality. Moreover, this eliminates the need for the employment of a part dedicated to the closure of the opening 14a, thus suppressing the increase in number of parts.

In addition, as FIG. 1 shows, a rising portion 21a rising toward the opening 14a side is formed on each of the closing pieces 21, and a flange 21b bent to the opening 14a side is formed around the closing piece 21.

As FIG. 17 shows, the rising portion 21a and the flange 21b engage with the edge portion of the opening 14a, thereby improving the sealing of the opening 14a. Moreover, the formation of these rising portion 21a and flange 21b facilitates the positioning at the mounting of the sealing member 2 on the housing 12 and enhances the rigidity of the closing piece 21.

Still additionally, if the opening 14a of the indentation 14 is mechanically engaged with the closing piece 21, the sealing member 2 is prevented from being peeled off the housing 12 when the housing 12 is rotated at the installation work, which eliminates the need for the adhesion between the housing 12 and the sealing member 2 and prevents the vibrations of the closing piece 21 stemming from the vibrations of the speaker.

Yet additionally, as FIG. 2 shows, a lip (lip means) 23, which enhances the sealing performance, is formed on a sealing member 2 side coming into contact with the door inner panel 3. This lip 23 is stood toward the door inner panel 3 side, and is formed integrally with the sealing member 2.

Figure 14:
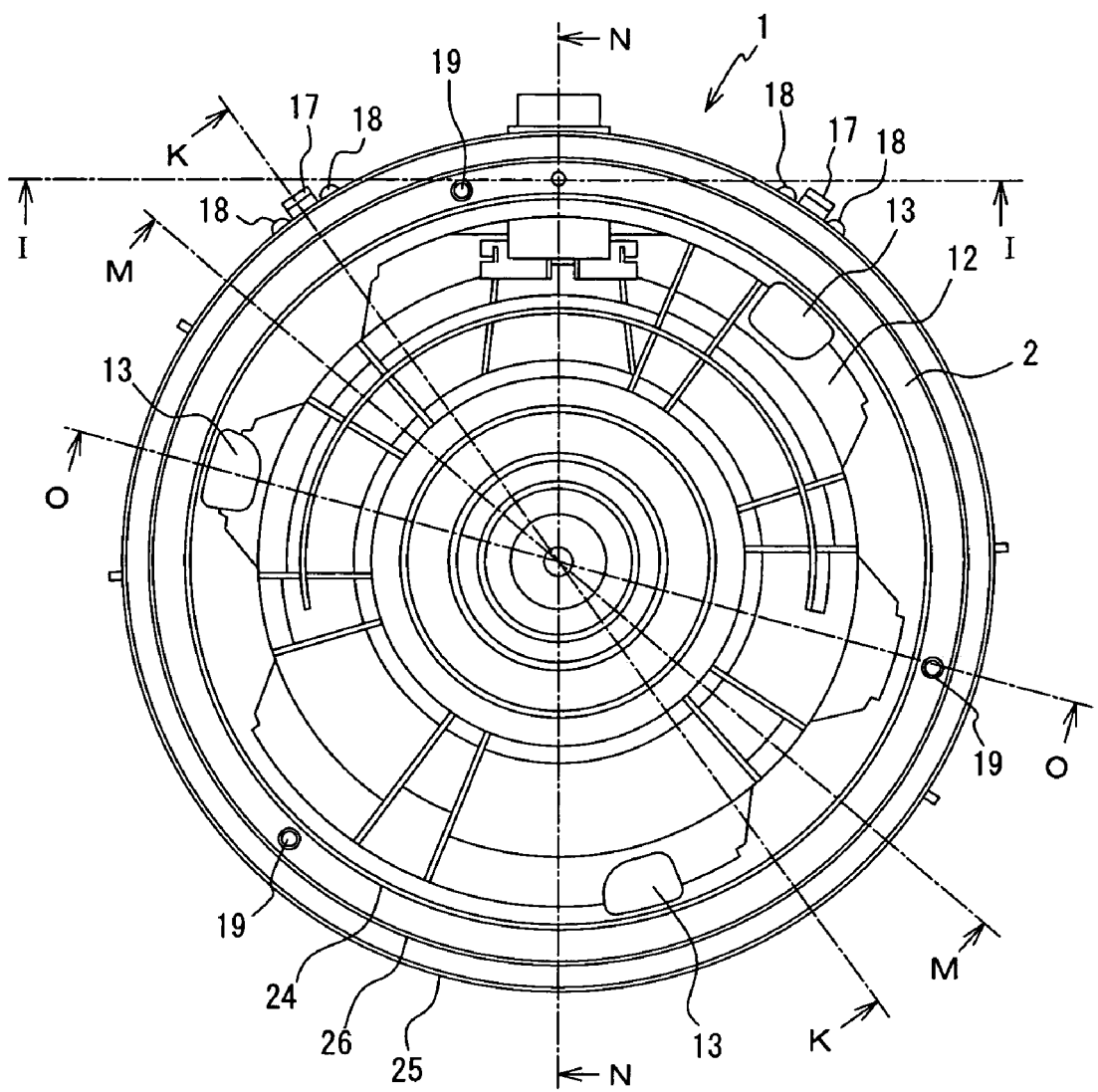
FIG. 14 is a back elevational view illustratively showing the speaker unit on the vehicle speaker installation structure according to the embodiment of the present invention.

In this case, as FIGS. 14 and 22 show, the lip 23 includes a first lip portion 24 formed on the center side (opening side) of the sealing member 2, a second lip portion 25 formed on the outer circumferential side with respect to the first lip portion 24 and a third lip 26 formed between the first lip portion 24 and the second lip portion 25. These lip portions 24 to 26 are formed concentrically, and are successively formed in circumferential directions of the sealing member 2.

Moreover, when the rubber-made sealing member 2 is put between the housing 12 and the door inner panel 3, the sliding resistance at the rotation of the speaker unit 1 is reducible at the installation work, which contributes to the improvement of the working efficiency.

Still moreover, the formation of the lip portions 24 to 26 contributes to efficient absorption of the vibrations of the speaker 11, thus offering stable installation to the door inner panel 3.

Yet moreover, as FIG. 22 shows, each of the lip portions 24 to 26 is formed into a triangular cross-section having the vertex on the door inner panel 3 side. Of these, the cross section of the first lip portion 24 is formed into a triangular configuration having a generally vertical plane or surface on the center side of the sealing member 2, while the cross section of the second lip portion 25 is formed into a triangular configuration having a generally vertical plane on the side opposite to the center thereof (that is, the outer circumferential side of the sealing member 2).

In addition, when the lip portions 24 to 26 have the cross-sectional configurations as mentioned above, as indicated by arrows in FIG. 22, the first lip portion 24 existing on the inner circumferential side is pushed down toward the inner circumferential side while the second lip portion 25 lying on the outer circumferential side is pushed down toward the outer circumferential side, and the third lip portion 26 is vertically squashed.

That is, the first lip portion 24 and the second lip portion 25 are made such that their cross-sectional configurations have a generally vertical plane, and a plane opposite to this vertical plane is inclined toward the vertical plane side and, therefore, these lip portions 24 and 25 fall toward the vertical plane sides at the speaker installation. Accordingly, the falling directions of the lip portions 24 and 25 are fixed, so the half way reversal of the lip portion falling direction is preventable, which prevents water or the like from entering through the reversed portion or prevents damages to the seal.

Still additionally, the first lip portion 24 can surely prevent water or the like from entering through the opening 4 side, and the second lip portion 25 can certainly prevent water or the like from entering through the outer circumferential side of the housing 12.

Figure 9:
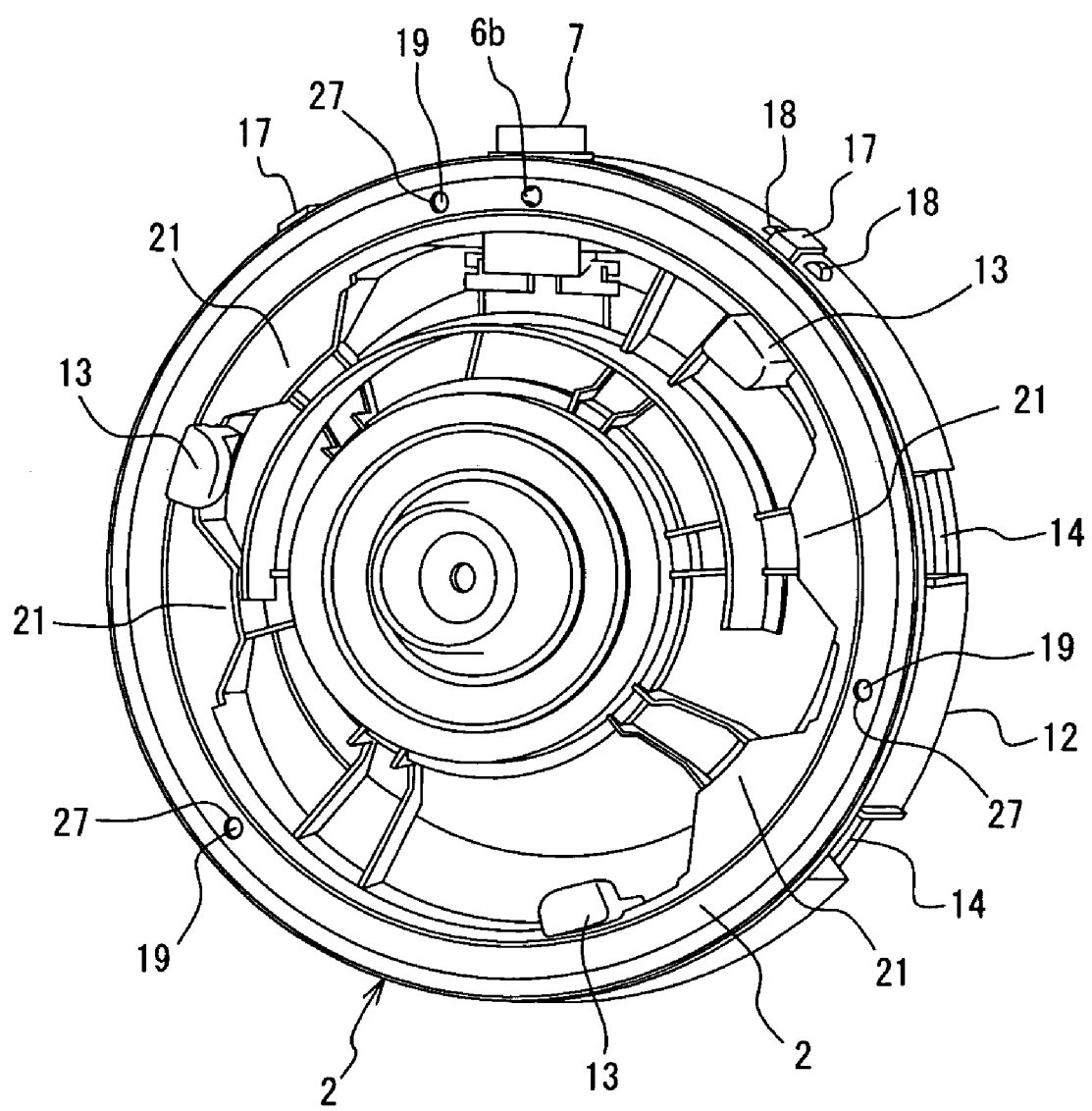
FIG. 9 is an illustrative view showing a sealing member mounted state of the speaker housing in the vehicle speaker installation structure according to the embodiment of the present invention.

Meanwhile, a plurality of projections 19 protruding toward the door inner panel 3 side are formed on the back side of the housing 12 at equal intervals as shown in FIGS. 2, 8, 9 and 14, and a hole portion 27 is made at a position [in this embodiment, between the first lip portion 24 and the third lip portion 26 (see FIG. 22)] corresponding to each of the projections 19 on the sealing member 2 as shown in FIGS. 1 and 9. Moreover, the tip portion of the projection 19 is made to have a semi-spherical configuration.

As FIG. 22 shows, the heights of the lip portions 24 to 26 are set to be higher than the height of the projections 19 in a state where the sealing member 2 is put on the housing 12, that is, when the projections 19 are inserted into the hole portions 27, respectively. That is, before the installation of the speaker unit 1 on the door inner panel 3, the height of the projections 19 is lower than the heights of the lip portions 24 to 26.

The positioning of the sealing member 2 is made in a manner that the projections 19 are inserted into the hole portions 27, and the lip collapse allowance is also controlled thereby at the assembling.

If no projections 19 are provided, when the speaker unit 1 is rotated for mounting, the lip portions 24 to 26 are pushed down until reaching a limit, which increases the sliding resistance at the rotation, thus leading to lowering the working efficiency.

On the other hand, with the vehicle speaker installation structure according to the present invention, in mounting the speaker unit 1 on the door inner panel 3, after the tip portions of the projections 19 come into contact with the door inner panel 3, the tips of the lip portions 24 to 26 are allowed to be brought down (collapsed) by a difference d (see FIG. 22) in height dimension with respect to the projections 19. That is, since the collapse allowance of the lip portions 24 to 26 is controlled by the height of the projections 19, when the speaker unit 1 is rotated in this state, the useless collapse of the lip portions 24 to 26 does not take place, which leads to the improvement of the working efficiency.

Incidentally, in addition to the above-mentioned construction, the projections 19 and the hole portions 27 can also be made between the second lip portion 25 and the third lip portion 26.

Moreover, since the tip portions of the projections 19 are formed into a semi-spherical configuration, the top portions of the projections 19 come into contact with the door inner panel 3 at the installation work so that the contact resistance between the door inner panel 3 and the sealing member 2 is reducible at the rotation, thus improving the installation working efficiency.

Still moreover, since the projections 19 are formed to be located at equal intervals on a circumference of the sealing member 2, the seal pressures due to the lip portions 24 to 26 are equalized, which leads to improving the sealing performance.

Yet moreover, clips 17 for holding or fixing a harness (not shown) for power supply to the speaker unit 1 are formed on an outer circumferential edge of the housing 12.

Figure 16:
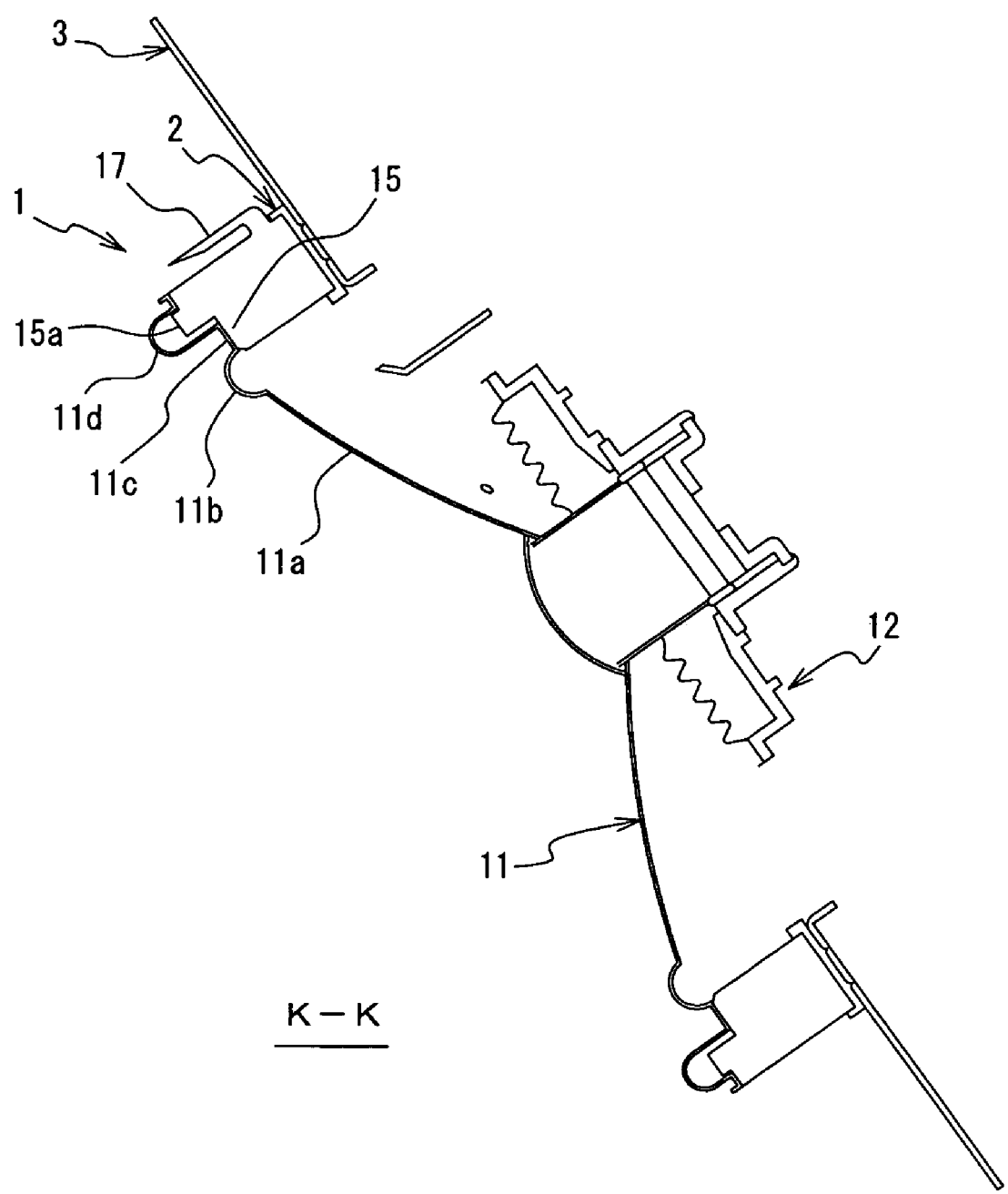
FIG. 16 is a cross-sectional view illustratively showing the speaker unit on the vehicle speaker installation structure according to the embodiment of the present invention, and is a cross-sectional taken along a line K—K of FIG. 14.

As FIG. 16 shows, each of the clips 17 is made such that its one end (proximal portion) is fixed to an outer circumference of the housing 12 while the other end (tip portion) is formed as an open end. Moreover, the tip portion of the clip 17 is formed into a wedge-like configuration. This clip 17 permits a harness to be easily inserted between the clip 17 and an outer circumference of the housing 12, thus enabling secure fixing of the harness. Still moreover, this prevents the harness from being made loose after the installation, and surely prevents the interference with other parts.

In addition, protruding portions 18 are made on the outer circumferential edge of the housing 12 and in the vicinity of the clips 17. The protruding portions 18 are located at both the sides of each of the clips 17, when viewed from a radial direction of the housing 12. Moreover, each of the protruding portions 18 is made such that its tip side (right side in FIG. 13) end portion has a round configuration and the opposite side (the proximal side of the clip 17; left side in FIG. 13) end portion has a generally vertical plane.

In this case, the protruding portions 18 are for preventing the falloff of the harness caught by the clip 17, and since the tip of the protruding portion 18 is formed into a round configuration, the protruding portions 18 do not interfere with the insertion of the harness but permitting smooth insertion of the harness into the clip 17 even by groping.

Still additionally, since the protruding portion 18 has a generally vertical plane at the proximal side of the clip 17, even if vibrations or impacts occur, the vertical plane limits the position of the harness to prevent the harness from separating from the clip 17.

Figure 11:
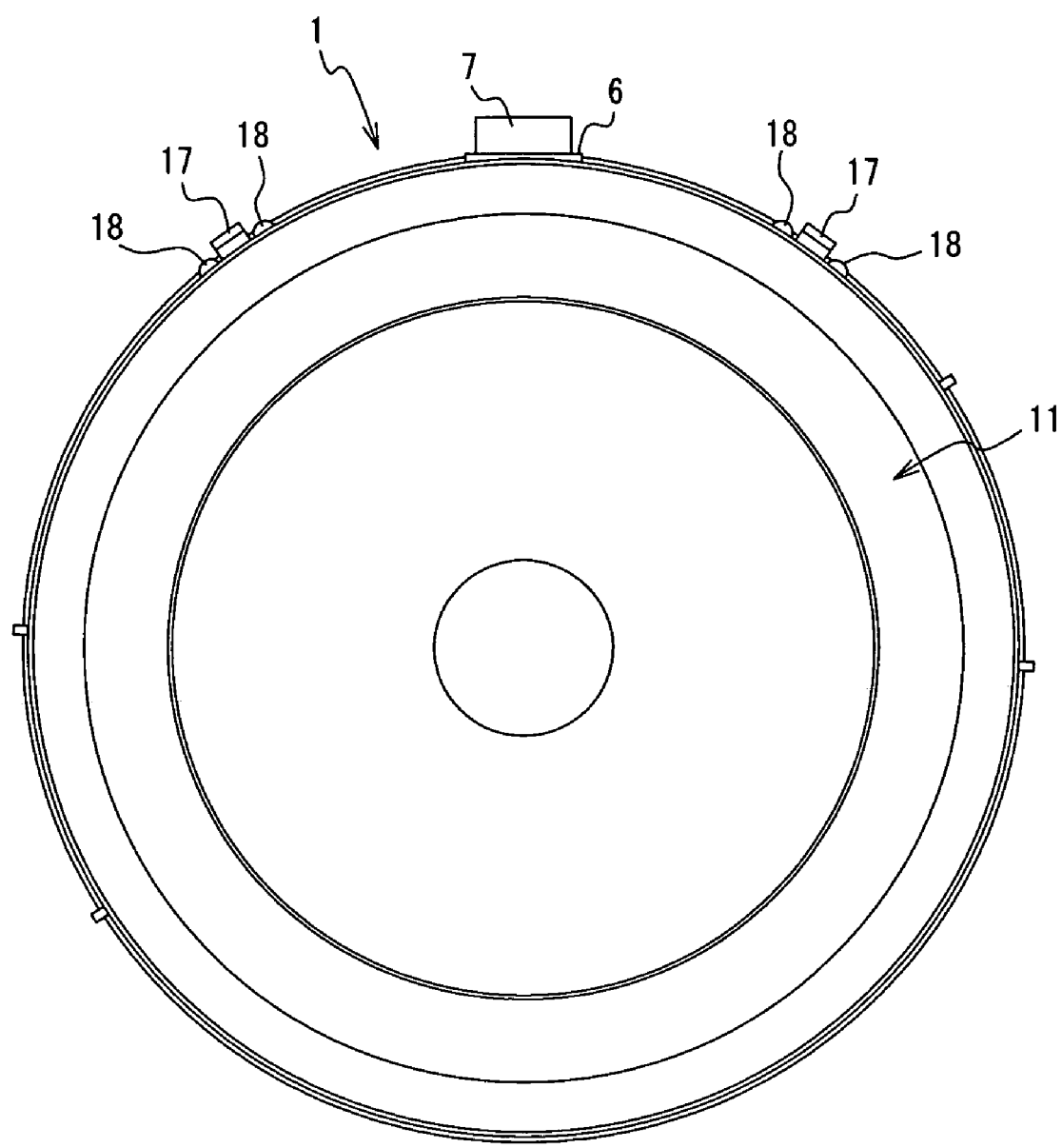
FIG. 11 is a front elevational view illustratively showing a speaker unit on the vehicle speaker installation structure according to the embodiment of the present invention.
Figure 13:
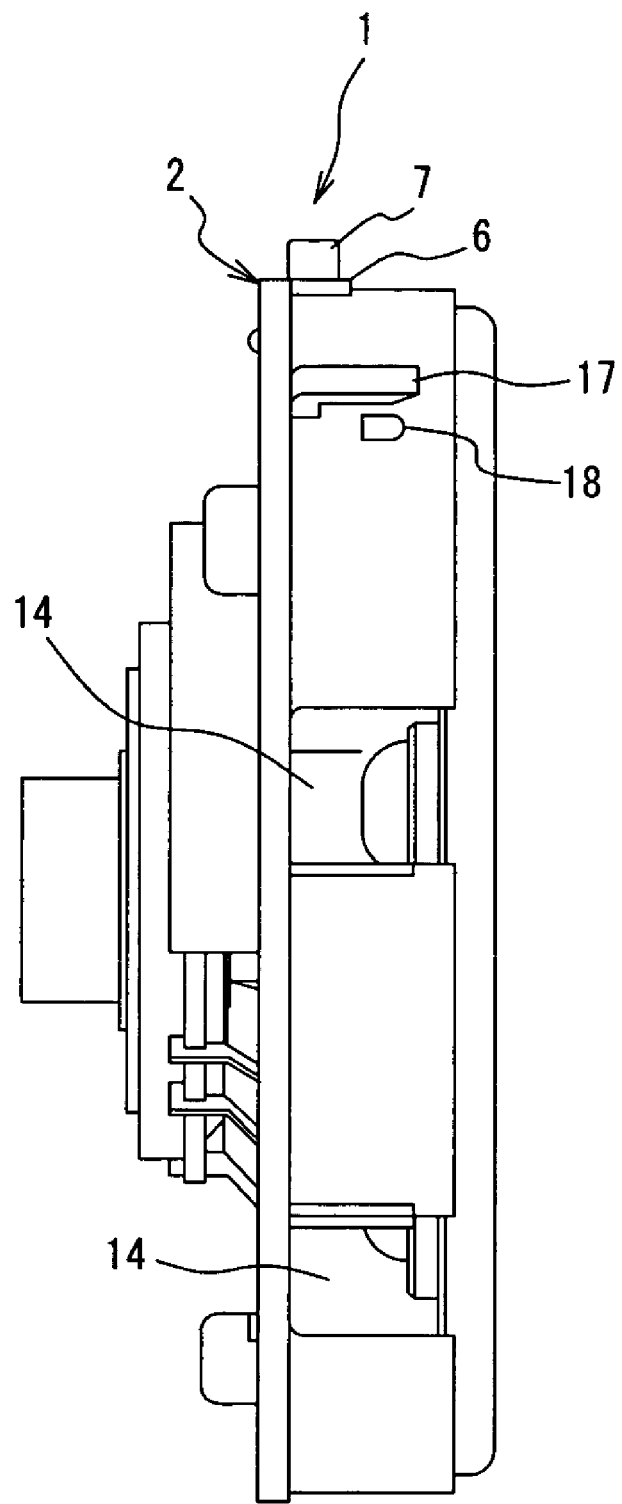
FIG. 13 is a side elevational view illustratively showing the speaker unit on the vehicle speaker installation structure according to the embodiment of the present invention.

Moreover, in this embodiment, as FIG. 11 shows, the clips 17 and the protruding portions 18 are placed symmetrically at two positions, i.e., at the right and left positions. This is for a left side speaker and a right side speaker to share the housing 12, and in fact, only one of two sets of the clips 17 and the protruding portions 18, existing at the right and left sides, is put to use.

Incidentally, the configuration of the clip 17 or the protruding portion 18 is not limited to this, but can be altered properly. For example, it is also appropriate that the tip of the protruding portion 18 is formed into a wedge-like configuration or a tapered configuration.

Still moreover, as FIGS. 1 and 2 show, an indentation 16 is made in the housing 12 to mount a connector 6 thereon. The connector 6 is coupled to a harness terminal 7 connected to the harness coming from the vehicle side for conducting power supply to the speaker. The connector 6 is constructed independently of the housing 12.

In addition, the indentation 16 for mounting the connector 6 is made to have a size corresponding to that of the connector 6, and when the connector 6 is fitted in the indentation 16, the connector 6 is attached to the housing 12.

Still additionally, an elastic piece 6a is formed on the connector 6 as shown in FIG. 2. This elastic piece 6a is made by cutting a portion of a surface of the connector 6 on the door inner panel 3 side, and one end portion (proximal portion) thereof is formed integrally with the connector 6 while the other end portion (tip portion) thereof is made as a free end. Yet additionally, a protruding portion 6b protruding toward the door inner panel 3 side is formed on the other end portion (tip portion) of the elastic piece 6a.

Moreover, as FIG. 1 shows, a hole portion 22, which engages with the aforesaid protruding portion 6b, is made in the sealing member 2. Likewise, a recess portion 31 is made in the door inner panel 3 to engage with the protruding portion 6b when the speaker housing 12 is rotated to reach a predetermined position.

Accordingly, in a case in which the speaker unit 1 is installed on the vehicle body, the housing 12 and the sealing member 2 are aligned with each other and put on each other, and then mounted on the door inner panel 3. At this time, as FIG. 21a shows, if the speaker unit 1 is not mounted at a correct position, the elastic piece 6a is deformed toward the inside of the connector 6, which makes it difficult to insert the vehicle body side harness terminal 7 into the connector 6.

Figure 15:
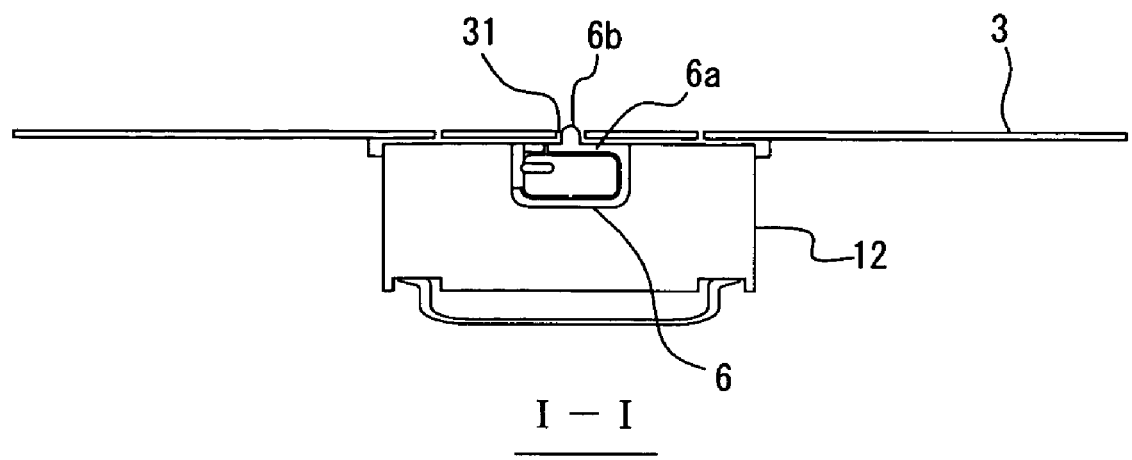
FIG. 15 is a cross-sectional view illustratively showing the speaker unit on the vehicle speaker installation structure according to the embodiment of the present invention, and is a cross-sectional taken along a line I—I of FIG. 14.

Still moreover, as FIGS. 15 and 21b show, when the speaker unit 1 is mounted at a correct position, the protruding portion 6b engages with the recess portion 31 of the door inner panel 3 and the restitutive power of the elastic piece 6a produces a condition in which the harness terminal 7 can be inserted into the connector 6.

Therefore, the harness wiring work can be done only after the speaker unit 1 is mounted at a correct position on the door panel 3, which prevents mistaken assembling.

Yet moreover, after the connection between the harness terminal 7 and the connector 6, except that the harness terminal 7 is pulled out, the deformation of the engaging piece 6 is limited as shown in FIG. 21b, which makes it difficult to release the protruding portion 6b from the engagement with the recess portion 31. Thus, the speaker unit 1 is automatically locked at the installation position except that the harness terminal 7 is disconnected therefrom, which securely prevents the falloff or looseness of the speaker unit 1 even if the opening and closure of the door are done repeatedly.

In this connection, in this embodiment, for example, the connector 6 including the elastic piece 6a is made of a PBT (polybutylene terephthalate), while the housing 12 is made of an ABS (acrylonitrile-butadiene-styrene) resin+a glass fiber. This is preferable when consideration is given to the fact that the firm construction of the housing 12 preferably affects the acoustic characteristic and the installation rigidity. However, such a firm material results in a narrow elastic deformation area, and when the connector 6 is formed integrally with the housing 12, the elastic piece 6a becomes hard to deform and becomes breakable.

For this reason, according to this embodiment, the housing 12 and the connector 6 are made independently of each other and the connector 6 is made of a material softer than that of the housing 12, thereby making the improvement of the sound quality and the aforesaid elastic deformation compatible with each other. Although the PBT is a relatively high-priced material, since the using range thereof is small, the speaker can be constructed at a low cost as a whole. Moreover, materials other than mentioned above are also employable if satisfying the condition that the connector 6 and the elastic piece 6a are made of a material softer than that of the housing 12. Still moreover, in the case of the employment of a material permitting the elastic deformation of the elastic piece 6a, it is also possible to form the connector 6 and the housing 12 integrally.

Since the vehicle speaker installation structure according to the embodiment of the present invention is made as described above, the following effects are obtainable.

That is, in the work for the installation of the speaker unit 1, after the claws 13 of the housing 12 are inserted into the slits 5 of the door inner panel 3, the speaker unit 1 is fixed to the door inner panel 3 in a manner that the housing 12 is rotated in its circumferential direction. Concretely, in a state where the tip portion 13a of each of the claws 13 is inserted into the corresponding first slit portion 51, the speaker unit 1 is rotated to shift the arm portion 13b to the interior of the second slit portion 52 so that the claw 13 engages with the slit 5, thereby fixedly securing the speaker unit 1 to the door inner panel 3. Moreover, at this time, the protruding portion 6b of the connector 6 engages with the recess portion 31 of the door inner panel 3, which makes the speaker unit 1 come into a locked condition with respect to the door inner panel 3.

Accordingly, when the speaker unit 1 is rotated to reach a correct installation position (predetermined position), the protruding portion 6b engages with the recess portion 31 to generate a detent sensation (moderation sensation), so a worker can sense that the speaker unit 1 has reached a correct position, which leads to the enhancement of the assembling efficiency.

In addition, in this embodiment, since the opening 4 is formed into a triangular configuration, even in a case in which the distance between the slits 5 and the flanges 44 of the opening 4 is set to be long, when the speaker unit 1 is rotated at the installation of the speaker unit 1, the claws 13 approaches the edge portion of the opening 4, i.e., the flanges 44, and after the installation, the engaging section is brought close to the flanges 44, thereby enhancing the installation rigidity.

Still additionally, the formation of the triangular opening 4 enables a large opening area, which prevents the impairment of the acoustic characteristic of the speaker.

Yet additionally, since the plurality of indentations 14 are formed on the outer circumference of the housing 12, the worker can surely hold the housing 12 at the installation work, which contributes to easy rotation of the speaker unit 1. Moreover, this eliminates the need for the employment of a special tool for the rotation of the speaker unit 1. Still moreover, there is an advantage of eliminating the need for a size increase of the speaker unit 1 for the improvement of the working efficiency.

Furthermore, after the installation of the speaker unit 1, the opening 14a of the indentation 14 is closed by the closing piece 21 of the rubber-made sealing member 2. This cuts off the air flow going through the opening 14a and raises sound quality. Still furthermore, the integral construction of the sealing member 2 and the closing piece 21 eliminates the need for the employment of a part dedicated to the closing of the opening 14a, thus suppressing the increase in number of parts.

In addition, since the sealing member 2 is interposed between the housing 12 and the door inner panel 3 as mentioned above, it is possible to reduce the sliding resistance at the rotation of the speaker unit 1 in the installation work, which leads to the improvement of the workability.

Still additionally, after the installation onto the door inner panel 3 of a motor vehicle, the speaker 11 is covered with a door inner trim (cover member) (not shown), and at this time, the expansion portion 11d of the speaker 11 is pushed by the trim flange 8 on the door inner trim in its axial direction as shown in FIG. 20. At this time, a gap is formed between the edge portion 15a and the trim flange 8 as illustrated, so the edge portion 15a ordinarily does not come into contact with the trim flange 8.

Thus, since the expansion portion 11d is pushed by the trim flange 8 so that the tip portion of the expansion portion 11d collapses, the expansion portion 11d comes closely into contact with the trim flange 8, which prevents the sound leakage through the gap therebetween and the generation of trembling sound or the like stemming from the expansion portion 11d and the door inner trim.

Incidentally, so far, a sponge or the like has been used without using this trim flange 8. However, this has caused an increase in cost because the work for adhering the sponge to the trim has been troublesome. On the other hand, according to this embodiment, because of the formation of the trim flange 8, the sponge member becomes unnecessary, which decreases the number of parts, coupled with improving the workability and reducing the cost.

In addition to the formation of the expansion portion 11d and the trim flange (second protruding portion) 8, the edge portion (first protruding portion) 15a, which protrudes toward the trim flange 8 side, is formed at a position of the housing 12 which is in opposed relation to the trim flange 8, and hence, even if the trim is pressed toward the speaker cone 11a side, the trim flange 8 and the edge portion 15a come into contact with each other prior to the contact between the trim surface and the cone edge 11b, thereby preventing further deformation of the trim.

Therefore, there is no need to use a so-called arrow rubber which has been required, so the construction becomes simple, which contributes to the cost reduction. Moreover, since the expansion portion 11d is formed integrally with the speaker cone 11a and the cone edge 11b, there is no need to conduct special positioning at the installation work.

Still additionally, the lip portions 24 to 26 (see FIG. 14) are trebly constructed on the sealing member 2 as mentioned above, and this treble construction of the lip portions 24 to 26 enables the vibrations of the speaker 11 to be efficiently absorbed, thereby providing stable installation to the door inner panel 3.

Moreover, as FIG. 22 shows, each of the first lip portion 24 and the second lip portion 25 is formed such that its cross-sectional configuration has a generally vertical plane, with a plane thereof, opposite to this vertical plane, being inclined toward the vertical plane side, so these lip portions 24 and 25 are pushed down toward the vertical plane side. Accordingly, the falling directions of the lip portions 24 and 25 are fixed, thereby preventing water or the like from entering due to the falling direction thereof being reversed halfway, or preventing the damage to the seal. Moreover, the first lip portion 24 can surely prevent water or the like from entering through the opening side while the second lip portion 25 can certainly prevent water or the like from entering through the outer circumference of the housing 12.

Still moreover, when the speaker unit 1 is installed on the door inner panel 3 and the tip portions of the projections 19 made on the back side of the housing 12 come into contact with the door inner panel 3, the tops of the lip portions 24 to 26 are allowed to be pushed down (collapsed) by a difference d in height dimension with respect to the projections 19. That is, the collapse allowances of the lip portions 24 to 26 are controlled in accordance with the height of the projections 19. Therefore, the collapse of the lip portions 24 to 26 more than needed is preventable at the rotation of the speaker unit 1, which contributes to improvement of the workability.

Yet moreover, on the outer circumference of the housing 12, there is provided the clip 17 made such that its one end (proximal portion) is fixedly secured to the housing 12 and the other end (tip portion) is formed as a wedge-like open end. This enables a harness to be easily inserted between the clip 17 and the outer circumference of the housing 12, which ensures certain fixing of the harness.

In addition, the protruding portion 18 placed in the vicinity of the tip portion of the clip 17 prevents the harness caught by the clip 17 from falling off. That is, since the tip of the protruding portion 18 is formed roundly, the protruding portion 18 does not interfere with the insertion of the harness, and the harness can smoothly be inserted into the clip 17 even by groping. Still additionally, since a generally vertical plane is formed at the proximal side of the clip 17, even if vibrations or impacts are inputted thereto, the position of the harness is restricted by the aforesaid vertical plane, thereby preventing the harness from being separated from the clip 17.

Secondly, taking note of the connector 6, this connector 6 is fitted in the indentation 16 made in the housing 12, and is attached to the housing 12.

Moreover, when the speaker unit 1 is installed on a vehicle body, as shown in FIG. 21a, if the speaker unit 1 is not placed at a correct position, the elastic piece 6a formed on the connector 6 is bent toward the interior of the connector 6, which inhibits the harness terminal 7 on the vehicle body side from being inserted into the connector 6. Still moreover, if the speaker unit 1 is mounted at the correct position as shown in FIG. 21b, the protruding portion 6b of the elastic piece 6a engages with the recess portion 31 of the door inner panel 3 to produce a condition in which the harness terminal 7 can be inserted into the connector 6 owing to the restitutive power of the elastic piece 6a.

Accordingly, not until the speaker unit 1 is set at an accurate position on the door panel 3, the harness wiring operation can be conducted, thus preventing mistaken assembling.

In addition, after the connection between the harness terminal 7 and the connector 6, not until the harness terminal 7 is pulled out, the protruding portion 6b and the recess portion 31 are released from the engagement with each other. This is because the deformation of the engaging piece 6 is restricted as shown in FIG. 21b.

This means that the speaker unit 1 is automatically locked at the mounting position before the removal of the harness terminal 7, thus surely preventing the falloff or looseness of the speaker unit 1 even if the opening and closure of the door is repeatedly done. Moreover, the connector 6 has a rotation preventing function, which eliminates the need for the employment of a new rotation preventing member, thus resulting in a simple structure.

It should be understood that the present invention is not limited to the above-described embodiment, and that it is intended to cover all changes and modifications of the embodiment of the invention herein which do not constitute departures from the spirit and scope of the invention. For example, although in the above description the opening of the door inner panel (panel member) 3 is formed into a generally triangular configuration having three linear portions, the present invention requires only formation of three or more linear portions, and as the configuration of the opening, a rectangular or pentagonal configuration is also acceptable.

Moreover, it is also appropriate to make an assembly of the speaker unit 1 being set on the aforesaid panel member 3 and to install this assembly on a frame or the like of a vehicle body.

Still moreover, in the description of this embodiment, the speaker is installed on a door of a vehicle. However, the present invention is also applicable to a case in which a speaker is placed on a rear shelf. In this case, the rear shelf panel is equivalent to the aforesaid panel member. Yet moreover, naturally, the present invention is also applicable to a case in which a speaker is installed at locations other than the aforesaid door or rear shelf.

INDUSTRIAL APPLICABILITY OF THE INVENTION

As described above, according to the present invention, the speaker unit is rotated at the installation of the speaker unit so that the claws approach the opening edge portion with a high rigidity and fall into an engagement condition in the vicinity of the edge portion, which achieves the improvement of the installation rigidity at a simple construction and enlarges the area of the opening to prevent the acoustic characteristic of the speaker from impairing. In addition to these advantages, there are various advantages, such as facilitating the installation work.

Accordingly, the present invention is suitable for use in vehicles such as cars, and it is considered that the usefulness thereof is extremely high.

The invention claimed is:

1. A speaker installation structure for a vehicle, comprising:
   a speaker unit (1) including a speaker housing (12) for holding a speaker body (11), said speaker housing (12) having a plurality of claws (13) formed thereon; and
   a panel member (3) having an opening (4) and a plurality of slits (5) made therein,
   said plurality of claws (13) being inserted into said plurality of slits (5), respectively, and said speaker unit (1) being mounted on said panel member (3) by rotating said speaker housing (12) in its circumferential direction,
   characterized in that said opening (4) has a diameter smaller than a diameter of said speaker housing (12) and has at least three linear portions (41), and each of said plurality of slits (5) is made outside said three linear portions (41) and inside an outer circumference of said speaker housing (12), and a plurality of indentations (14) are made in an outer circumference of said speaker housing (12), and a connector (6) to be connected to a harness terminal (7) for power supply to said speaker body (11) is placed on said speaker housing (12), and an elastic piece (6a), made to be elastically deformed by said panel member (3) in a direction opposite to said panel member (3) when said claws (13) are inserted into said slits (5) and returned to the panel member (3) side when said speaker housing (12) is rotated up to a predetermined position, is formed on said connector (6), with said harness terminal (7) being connectable to said connector (6) only when said elastic piece (6a) is returned to the panel member (3) side.

2. A speaker installation structure for a vehicle according to claim 1, characterized in that each of said claws (13) has an L-shaped cross section and has a tip portion (13a) bent toward the opening (4) side in an installed state of said speaker unit (1) and an arm portion (13b) connecting said tip portion (13a) to said speaker housing (12), and
   each of said slits (5) has a first slit portion (51) into which said tip portion (13a) of said claw (13) is inserted and a second slit portion (52) made to accept the insertion of only said arm portion (13b),
   after said tip portion (13a) of said claw (13) is inserted into said first slit portion (51), said speaker unit (1) being rotated to shift said arm portion (13b) to the interior of said second slit portion (52) so that said tip portion (13a) is brought close to an edge side of said opening (4).

3. A speaker installation structure for a vehicle according to claim 2, characterized in that a relatively positional relationship between said slits (5) and said linear portions (41) is set so that said claws (13) approach said linear portions (41) at the rotation of said speaker unit (1).

4. A speaker installation structure for a vehicle according to claim 3, characterized in that flanges (44) are formed on an opening edge portion of said opening (4) to protrude toward an opposite side to an installation side of said speaker unit (1).

5. A speaker installation structure for a vehicle according to claim 1, characterized in that said indentations (14) are located to be in symmetrical relation to each other with respect to the center of said speaker unit (1).

6. A speaker installation structure for a vehicle according to claim 1, characterized in that said speaker body (11) includes:
   a speaker cone (11a); and
   a cone edge (11b) formed on an outer circumference of said speaker cone (11a),
   said speaker housing (12) includes:
      a flange (15) made to come into contact with a cone flange (11c) formed on an outer circumferential edge portion of said cone edge (11b); and
      an opening (14a) made inside said flange (15) in an axial direction of said speaker housing (12), and
   each of said indentations (14) is formed by a first mold (9a) having an extension (91) which extends from said flange (15) through said opening (14a) in an axial direction of said speaker housing (12), with said extension (91) being drawn in an axial direction of said speaker housing (12), and a second mold (9b) extending from said flange (15) in an outer circumferential direction and made to be drawn in an axial direction opposite to said axial direction of the drawing of said first mold (9a).

7. A speaker installation structure for a vehicle according to claim 6, characterized in that a rubber-made sealing member (2) is placed on said speaker housing (12) of mounting side of said panel member (3), and a closing piece (21) is formed on said sealing member (2) for closing said opening (14a).

8. A speaker installation structure for a vehicle according to claim 1, characterized in that a harness for power supply is connected to said speaker unit (1), and a clip (17) for fixing said harness is formed on an outer circumferential edge of said speaker housing (12).

9. A speaker installation structure for a vehicle according to claim 8, characterized in that said clip (17) is constructed such that its one end is fixed to an outer circumference of said speaker housing (12) and the other end is an open end, and a projection (18) is formed on the outer circumference of said speaker housing (12) in the vicinity of the one end of said clip (17) to protrude outwardly.

10. A speaker installation structure for a vehicle according to claim 9, characterized in that a tip portion of the other end of said clip (17) is formed into a wedge-like configuration, and said projection (18) is made to have a roundness on the tip portion side of the other end of said clip (17) and a vertical surface on the opposite side thereof.

11. A speaker installation structure for a vehicle according to claim 1, characterized in that a protruding portion (6b) is formed on said elastic piece (6a) to protrude toward the panel member (3) side, and a recess portion (31) is made in said panel member (3) to engage with said protruding portion (6b) when said speaker housing (12) is placed at a predetermined position.

12. A speaker installation structure for a vehicle according to claim 11, characterized in that said connector (6) is constructed independently of said speaker housing (12), and at least said elastic piece (6a) is made of a material softer than that of said speaker housing (12).

* * * * *